US012809627B2

(12) United States Patent
Li et al.

(10) Patent No.: US 12,809,627 B2
(45) Date of Patent: Nov. 24, 2026

(54) NETWORK DEVICE-BASED DATA PROCESSING METHOD AND NETWORK DEVICE

(71) Applicant: HUAWEI TECHNOLOGIES CO., LTD., Shenzhen (CN)

(72) Inventors: Bojie Li, Shenzhen (CN); Lei Zhou, Hod Hasharon (IL)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 167 days.

(21) Appl. No.: 18/826,558

(22) Filed: Sep. 6, 2024

(65) Prior Publication Data

US 2024/0427598 A1 Dec. 26, 2024

Related U.S. Application Data

(63) Continuation of application No. PCT/CN2023/078920, filed on Mar. 1, 2023.

(30) Foreign Application Priority Data

Mar. 8, 2022 (CN) ......................... 202210227663.1

(51) Int. Cl.
*G06F 9/30* (2018.01)
*G06F 13/16* (2006.01)

(52) U.S. Cl.
CPC ........ *G06F 9/30058* (2013.01); *G06F 9/3001* (2013.01); *G06F 13/1663* (2013.01)

(58) Field of Classification Search
CPC ............... G06F 9/30058; G06F 9/3001; G06F 13/1663; G06F 9/54; G06F 13/128; G06F 15/17331; G06F 13/28; H04L 67/1097
See application file for complete search history.

(56) References Cited

U.S. PATENT DOCUMENTS 9,344,490 B2 5/2016 Bloch et al.
2011/0231615 A1* 9/2011 Ober .................... H04L 67/289 711/E12.103

(Continued)

FOREIGN PATENT DOCUMENTS

CN 103514028 A 1/2014
CN 106487896 A 3/2017

(Continued)

OTHER PUBLICATIONS

Waleed Reda et al:"RDMA is Turing complete, we just did not know it yet!",2103.13351v1 [cs.DC] Mar. 24, 2021, total 15 pages.

(Continued)

*Primary Examiner* — Farley Abad
(74) *Attorney, Agent, or Firm* — WOMBLE BOND DICKINSON (US) LLP

(57) ABSTRACT

This application discloses a network device-based data processing method and a network device, and may be applied to the field of memory access. A control unit (for example, a CPU) of a first computer device constructs an orchestration operator based on execution logic of a request generated by an application. The first computer device only needs to send the orchestration operator to a first network device for one time via the control unit, and the first network device performs parsing based on the orchestration operator, to obtain a corresponding memory access operation. After all memory access operations are completed, the first network device reports a completion instruction to the control unit. In this application, the constructed orchestration operator is used to execute user-programmable logic, to reduce a quantity of interactions between the first computer device and the first network device.

20 Claims, 12 Drawing Sheets

(56) References Cited

U.S. PATENT DOCUMENTS

| | | | | |
|---|---|---|---|---|
| 2015/0242324 | A1* | 8/2015 | Novakovic | G06F 12/0813 711/121 |
| 2020/0137161 | A1* | 4/2020 | Chintada | H04L 49/356 |
| 2020/0278857 | A1* | 9/2020 | Fakhouri | G06F 9/5038 |
| 2021/0406179 | A1 | 12/2021 | Marcovitch et al. | |

FOREIGN PATENT DOCUMENTS

| | | | |
|---|---|---|---|
| CN | 111880908 | A | 11/2020 |
| CN | 112243032 | A | 1/2021 |

OTHER PUBLICATIONS

David Sidler et al:“StRoM: Smart Remote Memory”,EuroSys’20, Apr. 27-30, 2020, Heraklion, Greece, total 16 pages.

Ming Liu et al:“Offloading Distributed Applications onto SmartNICs using iPipe”,SIGCOMM’19, Aug. 19-23, 2019, Beijing, China, total 16 pages.

* cited by examiner

NETWORK DEVICE-BASED DATA PROCESSING METHOD AND NETWORK DEVICE

CROSS-REFERENCE TO RELATED APPLICATIONS

This application is a continuation of No. International Application PCT/CN2023/078920, filed on Mar. 1, 2023, which claims priority to Chinese Patent Application No. 202210227663.1, filed on Mar. 8, 2022. The disclosures of the aforementioned applications are hereby incorporated by reference in their entireties.

TECHNICAL FIELD

This application relates to the field of memory access, and in particular, to a network device-based data processing method and a network device.

BACKGROUND

In the field of memory access technologies, two-sided operations and one-sided (one-sided) operations are involved. For example, a send/receive operation in a conventional transmission control protocol (TCP) socket or remote direct memory access (RDMA) is a two-sided operation that can be completed only with sensing and participation of a remote application. Essentially, this is communication between two processes, which requires participation of a central processing unit (CPU) of a local device and a CPU of a remote device. This consumes CPU resources of the local device and the remote device. A read/write operation in the RDMA is a one-sided operation. A biggest difference between the RDMA and conventional network transmission lies in a one-sided operation transmission mode. In the one-sided operation transmission mode, only a virtual address needs to be provided for remote access, and a remote application does not need to participate, which is equivalent to a memory copy function (memcpy) between a local memory and a remote memory.

Memory access includes remote memory access and local memory access. Regardless of local memory access or remote memory access, a local computer device executes at a granularity of a "memory access operation." For example, when the local computer device needs to send one piece of data to 100 remote computer devices, a CPU of the local computer device needs to interact with a local network device (for example, a network interface card) for 100 times. In other words, the local CPU needs to construct a network packet corresponding to each operation and send the network packet to the local network device. Consequently, local CPU resources are wasted, and the local CPU is frequently interrupted by returned response results (which may also be referred to as processing results).

In addition, in a case of remote memory access, distributed request (which may also be referred to as distributed transaction) processing is further involved. For example, when a data structure in a remote memory is accessed, a conventional distributed transaction processing manner is CPU-based two-sided access, that is, the two-sided operation. In other words, a CPU of a transaction initiator sends a transaction to a CPU of a receiver, and the CPU of the receiver sends a processing result to the initiator after processing the transaction. However, CPU-based two-sided access consumes a CPU resource, and has a high tail latency when CPU load is high.

SUMMARY

Embodiments of this application provide a network device-based data processing method and a network device, to construct a corresponding orchestration operator based on execution logic of a request generated by an application. A local first computer device only needs to send the orchestration operator to a local first network device via a control unit (for example, a CPU) for one time, and the local first network device performs parsing based on the orchestration operator, to obtain a corresponding memory access operation (which may be remote memory access or local memory access). After all memory access operations are completed, the local first network device reports a completion instruction to the control unit of the local first computer device. In this application, the constructed orchestration operator is used to execute user-programmable logic, to reduce a quantity of interactions between the control unit of the first computer device and the first network device. If the memory access operation is a remote memory access operation, a quantity of network round-trips for a distributed request can be further reduced. This prevents the control unit of the first computer device from being repeatedly interrupted by response results. Therefore, the control unit can execute another computing task during communication, to implement parallel computing and communication.

In view of this, embodiments of this application provide the following technical solutions:

According to a first aspect, an embodiment of this application first provides a network device-based data processing method and a network device, and may be used in the field of memory access, for example, the field of remote memory access technologies. A first network device (namely, a local network device, which may also be referred to as an initiator network device) obtains a first orchestration operator, for example, obtaining the first orchestration operator from a computer device (which may be referred to as a first computer device) corresponding to the first network device. The first orchestration operator is an ordered set of orchestration commands generated by a control unit (for example, a CPU) of the first computer device based on a first request, and indicates execution logic of the first request, the first request is a request generated by target software (which may be referred to as first software or a first application) currently being executed on the first computer device, the first orchestration operator at least includes a memory access command, and the memory access command indicates a type of a memory access operation. After obtaining the first orchestration operator, the first network device further performs a plurality of memory access operations based on the first orchestration operator. After each memory access operation is performed, the first network device obtains a response result (which may also be referred to as an execution result, a return result, or the like, and this is not limited in this application) corresponding to each memory access operation. For example, it is assumed that the first network device obtains k memory access operations based on the first orchestration operator. Then, k response results are correspondingly obtained, where one memory access operation corresponds to one response result, and $k \geq 1$. The first network device triggers generation of a completion instruction (which may also be referred to as a completion event) after obtaining the response result that respectively corresponds to each memory access operation. A completion instruction corresponding to the first orchestration operator is a first completion instruction, and the first completion instruction indicates that execution of the first orchestration operator is completed. In some embodiments of this application, the first network device may send the first completion instruction to the control unit of the first computer device, so that the control unit of the first computer device knows that execution of the first orchestration operator is completed. Alternatively, the first computer device may periodically access the first network device, to learn in time whether the first network device generates the first completion instruction, and determine, according to the first completion instruction, whether execution of the first orchestration operator is completed. A specific implementation of how the first computer device learns that execution of the first orchestration operator is completed is not limited in this application.

In the foregoing some embodiment of this application, the corresponding orchestration operator is constructed based on the execution logic of the request generated by the application. The local first computer device only needs to send the orchestration operator to the local first network device via the control unit for one time, and the local first network device performs parsing based on the orchestration operator, to obtain the corresponding memory access operation (which may be remote memory access or local memory access). After all memory access operations are completed, the local first network device reports a completion instruction to the control unit of the local first computer device. In this application, the constructed orchestration operator is used to execute user-programmable logic, to reduce a quantity of interactions between the control unit of the first computer device and the first network device. If the memory access operation is a remote memory access operation, a quantity of network round-trips for a distributed request can be further reduced. This prevents the control unit of the first computer device from being repeatedly interrupted by response results. Therefore, the control unit can execute another computing task during communication, to implement parallel computing and communication.

In an embodiment, the first network device further generates an orchestration context (which may be referred to as a first orchestration context) corresponding to the first orchestration operator. The first orchestration context is used to store an intermediate status of an orchestration task (namely, a memory access operation) during execution.

In the foregoing embodiment of this application, the first network device stores, in the orchestration context, an intermediate status of each memory access operation during execution, to concurrently execute, in a form of different parameters, a plurality of requests that are from one orchestration operator or a plurality of orchestration operators.

In an embodiment, the first orchestration context may include at least one of the following: a caller (namely, the first computer device) of the first orchestration operator, a pointer of a currently executed orchestration command, a counter of an asynchronously executed orchestration command, a location of a last orchestration command in the orchestration operator, a loop counter, a loop jump location, an intermediate variable in a process of executing the orchestration task, and the like.

In the foregoing embodiment of this application, content included in the first orchestration context is specifically described, and is implementable.

In an embodiment, because the memory access operation may be a local memory access operation or a remote memory access operation, a manner in which the first network device obtains the corresponding response result varies with a type of the memory access operation. When the memory access operation is a remote memory access operation, a process in which the first network device performs the plurality of memory access operations based on the first orchestration operator, and obtains the response result of each memory access operation may be as follows: the first network device parses the orchestration command in the first orchestration operator, to obtain P remote memory access operations, where P≥1. For example, the first network device may parse a variable parameter (for example, a return value of a previous orchestration command and an intermediate variable in the first orchestration context) of the orchestration command in the first orchestration operator. The variable parameter is a parameter whose specific value can be determined only when the orchestration command is executed. Then, the first network device generates a network packet that respectively corresponds to each remote memory access operation. One remote memory access operation may access a memory segment. If a length of a memory exceeds a maximum size of a single network packet, the network packet is split into a plurality of network packets. In other words, one remote memory access operation may correspond to one or more network packets. This is not specifically limited in this application. After generating the network packet that respectively corresponds to each remote memory access operation, the first network device may send each network packet to a respectively corresponding remote network device (which may be referred to as a second network device). There may be one or more remote network devices, which is determined based on a specific situation during application. This is not limited in this application. After receiving the respective network packet, each second network device accesses, based on information carried in the respective network packet, a memory (namely, a remote memory of the first network device) that respectively corresponds to the second network device, and generates a corresponding response result after completing access. One remote memory access operation corresponds to one response result. Finally, each response result is returned to the first network device.

In the foregoing embodiment of this application, a specific procedure of executing the orchestration operator when the memory access operation is a remote memory access operation is specifically described. In the process, a control unit of a remote computer device does not need to participate, to save a resource, for example, a CPU resource, of the control unit of the remote computer device.

In an embodiment, when the memory access operation is a local memory access operation, a process in which the first network device executes the plurality of memory access operations based on the first orchestration operator, and obtains the response result of each memory access operation may be as follows: the first network device parses the orchestration command in the first orchestration operator, to obtain Q local memory access operations, where Q≥1. For example, the first network device may parse a variable parameter (for example, a return value of a previous orchestration command and an intermediate variable in the first orchestration context) of the orchestration command in the first orchestration operator. Then, the first network device directly accesses a local memory based on each local memory access operation, to obtain a response result of each local memory access operation.

In the foregoing embodiment of this application, the orchestration operator may be used to perform both the remote memory access operation and the local memory access operation, and is widely applicable.

In an embodiment, a manner in which the first network device obtains the first orchestration operator from the first computer device may be as follows: the first network device receives an execution instruction that may be referred to as a first execution instruction from the first computer device. The first execution instruction instructs the first network device to read the first orchestration operator from a first storage area. In some embodiments of this application, the first orchestration operator may be stored in the first storage area by the CPU of the first computer device. The first storage area is a preset storage area (for example, a DDR memory), and serves as a storage area of an orchestration operator. All orchestration operators generated by the control unit of the first computer device may be stored in the first storage area. The first storage area may be located in the first computer device, the first network device, or another third-party device. This is not specifically limited in this application.

In the foregoing embodiment of this application, when the first network device needs an orchestration operator, the orchestration operator may be called from the first storage area at any time according to the execution instruction, to save storage space of the first network device.

In an embodiment, a manner in which the first network device obtains the first orchestration operator from the first computer device may alternatively be as follows: after generating the first orchestration operator, the control unit of the first computer device directly sends the first orchestration operator to the first network device, that is, the first network device receives the first orchestration operator directly sent by the first computer device. Usually, a simple orchestration operator may be directly sent.

In the foregoing embodiment of this application, alternatively, the first network device may directly receive the first orchestration operator directly sent by the control unit of the first computer device, to simplify an operation, and reduce time in an overall execution process of the orchestration operator.

In an embodiment, the first orchestration operator includes at least one type of the following orchestration commands: a control command and a computation command. The control command is used to control the first network device, and the computation command is used to perform an arithmetic and/or logical operation on at least one operand.

In the foregoing embodiment of this application, to more flexibly express internal execution logic of a request generated by an application, and enable the orchestration operator to express both a static workflow diagram and a dynamic workflow diagram, the orchestration operator not only includes the memory access command. This is widely applicable.

In an embodiment, a type of the control command includes at least one of the following: a conditional jump command, a loop command, a wait command, a local orchestration operator call command, a remote orchestration operator call command, and an orchestration end command. The conditional jump command is used to jump to at least one first target orchestration command based on at least one variable parameter, for example, jumping to the at least one first target orchestration command based on a value of one variable parameter, a comparison result between two variable parameters, or a comparison result between one variable parameter and a constant, where the variable parameter is a parameter whose specific value is determined only when the orchestration command is executed. The loop command is used to cyclically execute at least one second target orchestration command for m times, where m≥1. The wait command is used to wait until execution of at least one third target orchestration command is completed. The local orchestration operator call command is used to asynchronously call a local orchestration operator. The remote orchestration operator call command is used to asynchronously call a remote orchestration operator. The orchestration end command is used to end execution of an orchestration context.

In the foregoing embodiment of this application, several typical command types included in the control command are specifically described. This can control an execution sequence and an execution process of the orchestration commands, and is controllable.

In an embodiment, a type of the computation command includes at least one of the following: a binary arithmetic and/or logical computation command and a bit width conversion computation command. The binary arithmetic and/or logical computation command is used to obtain a first computation result based on two operands, and the bit width conversion computation command is used to convert a bit width of an operand, to obtain a second computation result.

In the foregoing embodiment of this application, several typical command types included in the computation command are specifically described, to express a computation process of the variable parameter.

In an embodiment, a type of the memory access command includes at least one of the following: a load command (which may also be referred to as a load command), a store command (which may also be referred to as a store command), a memory copy command (which may also be referred to as a memcpy command), a compare command (which may also be referred to as a memcmp command), a send/receive command (send/recv command), an atomic compare and swap command (which may also be referred to as an atomic compare and write command), an atomic add command (which may also be referred to as an atomic compare and add command), and an exclusive atomic command (which may also be referred to as an exclusive atomic command). The load command is used to fetch first data of a preset quantity of bytes from a local memory address, or fetch second data of a preset quantity of bytes from a remote memory address. The store command is used to write third data of a preset quantity of bytes into the local memory address, or write fourth data of a preset quantity of bytes into the remote memory address. The memory copy command is used to copy local or remote data. The compare command is used to compare local or remote data. The send/receive command is used to send/receive a two-sided message. The atomic compare and swap command is used to perform atomic swap with a comparison condition and a mask on fifth data of a preset quantity of bytes. The atomic add command is used to perform an atomic add operation with a comparison condition on sixth data of a preset quantity of bytes. The exclusive atomic command is used to obtain exclusive access permission for a local or remote memory address according to a cache coherence protocol.

In the foregoing embodiment of this application, several typical command types included in the memory access command are specifically described, to synchronously or asynchronously read/write memory data and perform message sending or an atomic operation. This is flexible.

According to a second aspect, an embodiment of this application further provides a network device-based data processing method. A first network device (namely, a local network device, which may also be referred to as an initiator network device) obtains a target execution instruction from a first computer device. The target execution instruction instructs a second network device to read a second orchestration operator from a second storage area, the second orchestration operator may be stored in the second storage area by a control unit of a second computer device, and the second orchestration operator is an ordered set of orchestration commands generated by the control unit of the second computer device based on a second request, and indicates execution logic of the second request. The second request is a request generated by a second application executed on the second computer device, the second orchestration operator includes a memory access command, and the memory access command indicates a type of a memory access operation. After receiving the target execution instruction sent by the first computer device, the first network device generates, according to the target execution instruction, a corresponding network packet that may be referred to as a target network packet. Then, the first network device further sends the target network packet to the second network device, so that the second network device reads the second orchestration operator from the second storage area based on the target network packet, the second network device performs a plurality of memory access operations based on the second orchestration operator, and the second network device obtains a response result of each memory access operation and generates a target response of the target network packet. The first network device triggers generation of a completion instruction (which may also be referred to as a completion event) after receiving the target response sent by the second network device. A completion instruction corresponding to the second orchestration operator is a second completion instruction, and the second completion instruction indicates that execution of the second orchestration operator is completed. Similarly, in some embodiments of this application, the first network device may send the second completion instruction to a control unit of the first computer device, so that the control unit of the first computer device knows that execution of the second orchestration operator is completed. Alternatively, the first computer device may periodically access the first network device, to learn in time whether the first network device generates the second completion instruction, and determine, according to the second completion instruction, whether execution of the second orchestration operator is completed. A specific implementation of how the first computer device learns that execution of the second orchestration operator is completed is not limited in this application.

In the foregoing implementations of this application, a case in which the initiator network device may call an orchestration operator of a remote network device is specifically described. The orchestration operator provided in this application is a unified programming abstraction. Therefore, a problem that network devices of different architectures are incompatible with each other is resolved, and efficiency is high.

In an embodiment, the second orchestration operator includes at least one type of the following orchestration commands: a control command and a computation command. The control command is used to control the second network device, and the computation command is used to perform an arithmetic and/or logical operation on at least one operand.

In the foregoing embodiment of this application, to more flexibly express internal execution logic of a request generated by an application, and enable the orchestration operator to express both a static workflow diagram and a dynamic workflow diagram, the orchestration operator not only includes the memory access command. This is widely applicable.

In an embodiment, a type of the control command includes at least one of the following: a conditional jump command, a loop command, a wait command, a local orchestration operator call command, a remote orchestration operator call command, and an orchestration end command. The conditional jump command is used to jump to at least one first target orchestration command based on at least one variable parameter, for example, jumping to the at least one first target orchestration command based on a value of one variable parameter, a comparison result between two variable parameters, or a comparison result between one variable parameter and a constant, where the variable parameter is a parameter whose specific value is determined only when the orchestration command is executed. The loop command is used to cyclically execute at least one second target orchestration command for m times, where $m \geq 1$. The wait command is used to wait until execution of at least one third target orchestration command is completed. The local orchestration operator call command is used to asynchronously call a local orchestration operator. The remote orchestration operator call command is used to asynchronously call a remote orchestration operator. The orchestration end command is used to end execution of an orchestration context.

In the foregoing embodiment of this application, several typical command types included in the control command are specifically described. This can control an execution sequence and an execution process of the orchestration commands, and is controllable.

In an embodiment, a type of the computation command includes at least one of the following: a binary arithmetic and/or logical computation command and a bit width conversion computation command. The binary arithmetic and/or logical computation command is used to obtain a first computation result based on two operands, and the bit width conversion computation command is used to convert a bit width of an operand, to obtain a second computation result.

In the foregoing embodiment of this application, several typical command types included in the computation command are specifically described, to express a computation process of the variable parameter.

In an embodiment, a type of the memory access command includes at least one of the following: a load command (which may also be referred to as a load command), a store command (which may also be referred to as a store command), a memory copy command (which may also be referred to as a memcpy command), a compare command (which may also be referred to as a memcmp command), a send/receive command (send/recv command), an atomic compare and swap command (which may also be referred to as an atomic compare and write command), an atomic add command (which may also be referred to as an atomic compare and add command), and an exclusive atomic command (which may also be referred to as an exclusive atomic command). The load command is used to fetch first data of a preset quantity of bytes from a local memory address, or fetch second data of a preset quantity of bytes from a remote memory address. The store command is used to write third data of a preset quantity of bytes into the local memory address, or write fourth data of a preset quantity of bytes into the remote memory address. The memory copy command is used to copy local or remote data. The compare command is used to compare local or remote data. The send/receive command is used to send/receive a two-sided message. The atomic compare and swap command is used to perform atomic swap with a comparison condition and a mask on fifth data of a preset quantity of bytes. The atomic add command is used to perform an atomic add operation with a comparison condition on sixth data of a preset quantity of bytes. The exclusive atomic command is used to obtain exclusive access permission for a local or remote memory address according to a cache coherence protocol.

In the foregoing embodiment of this application, several typical command types included in the memory access command are specifically described, to synchronously or asynchronously read/write memory data and perform message sending or an atomic operation. This is flexible.

According to a third aspect, an embodiment of this application further provides a network device-based data processing method. A second network device receives a target network packet sent by a first network device. The target network packet is generated by the first network device according to a target execution instruction, the target execution instruction instructs the second network device to read a second orchestration operator from a second storage area, the second orchestration operator may be stored in the second storage area by a control unit of a second computer device, and the second orchestration operator is an ordered set of orchestration commands generated by the control unit of the second computer device based on a second request, and indicates execution logic of the second request. The second request is a request generated by a second application executed on the second computer device, the second orchestration operator includes a memory access command, and the memory access command indicates a type of a memory access operation. After receiving the target network packet that corresponds to the target execution instruction and that is sent by the first network device, the second network device reads the second orchestration operator from the second storage area based on information carried in the target network packet. After obtaining the second orchestration operator, the second network device further performs a plurality of memory access operations based on the second orchestration operator. After each memory access operation is performed, the second network device obtains a response result (which may also be referred to as an execution result, a return result, or the like, and this is not limited in this application) corresponding to each memory access operation. For example, it is assumed that the second network device obtains k' memory access operations based on the second orchestration operator. Then, k' response results are correspondingly obtained, where one memory access operation corresponds to one response result, and k'≥1. The second network device generates a target response of the target network packet after receiving the response result that respectively corresponds to each memory access operation, and sends the target response to the first network device, so that the first network device generates a second completion instruction based on the target response. The second completion instruction indicates that execution of the second orchestration operator is completed.

In the foregoing embodiment of this application, a case in which the initiator network device may call an orchestration operator of a remote network device is specifically described. The orchestration operator provided in this application is a unified programming abstraction. Therefore, a problem that network devices of different architectures are incompatible with each other is resolved, and efficiency is high.

In an embodiment, the second network device further generates an orchestration context (which may be referred to as a second orchestration context) corresponding to the second orchestration operator. The second orchestration context is used to store an intermediate status of an orchestration task (namely, a memory access operation) during execution.

In the foregoing embodiment of this application, the second network device stores, in the orchestration context, an intermediate status of each memory access operation during execution, to concurrently execute, in a form of different parameters, a plurality of requests that are from one orchestration operator or a plurality of orchestration operators.

In an embodiment, the second orchestration context may include at least one of the following: a caller (namely, the second computer device) of the second orchestration operator, a pointer of a currently executed orchestration command, a counter of an asynchronously executed orchestration command, a location of a last orchestration command in the orchestration operator, a loop counter, a loop jump location, an intermediate variable in a process of executing the orchestration task, and the like.

In the foregoing embodiment of this application, content included in the second orchestration context is specifically described, and is implementable.

In an embodiment, because the memory access operation may be a local memory access operation or a remote memory access operation, a manner in which the second network device obtains the corresponding response result varies with a type of the memory access operation. When the memory access operation is a remote memory access operation, a process in which the second network device performs the plurality of memory access operations based on the second orchestration operator, and obtains the response result of each memory access operation may be as follows: the second network device parses the orchestration command in the second orchestration operator, to obtain P' remote memory access operations, where P'≥1. For example, the second network device may parse a variable parameter (for example, a return value of a previous orchestration command and an intermediate variable in the second orchestration context) of the orchestration command in the second orchestration operator. The variable parameter is a parameter whose specific value can be determined only when the orchestration command is executed. Then, the second network device generates a network packet that respectively corresponds to each remote memory access operation. One remote memory access operation may access a memory segment. If a length of a memory exceeds a maximum size of a single network packet, the network packet is split into a plurality of network packets. In other words, one remote memory access operation may correspond to one or more network packets. This is not specifically limited in this application. After generating the network packet that respectively corresponds to each remote memory access operation, the second network device may send each network packet to a respectively corresponding remote network device (which may be referred to as a third network device). There may be one or more remote network devices, which is determined based on a specific situation during application. This is not limited in this application. After receiving the respective network packet, each third network device accesses, based on information carried in the respective network packet, a memory (namely, a remote memory of the second network device) that respectively corresponds to the third network device, and generates a corresponding response result after completing access. One remote memory access operation corresponds to one response result. Finally, each response result is returned to the second network device.

In the foregoing embodiment of this application, a specific procedure of executing the orchestration operator when the memory access operation is a remote memory access operation is specifically described. In the process, a control unit of a third-party computer device does not need to participate, to save a resource, for example, a CPU resource, of the control unit of the third-party computer device.

In an embodiment, the third network device may be the first network device (which is an initiator of remote calling), or another network device different from the first network device. This is not specifically limited in this application.

In the foregoing embodiment of this application, the third network device is not limited. This is widely applicable.

In an embodiment, when the memory access operation is a local memory access operation, a process in which the second network device performs the plurality of memory access operations based on the second orchestration operator, and obtains the response result of each memory access operation may be as follows: the second network device parses the orchestration command in the second orchestration operator, to obtain Q local memory access operations, where Q≥1. For example, the second network device may parse a variable parameter (for example, a return value of a previous orchestration command and an intermediate variable in the first orchestration context) of the orchestration command in the second orchestration operator. The variable parameter is a parameter whose specific value can be determined only when the orchestration command is executed. Then, the second network device directly accesses a local memory based on each local memory access operation, to obtain a response result of each local memory access operation.

In the foregoing embodiment of this application, the orchestration operator may be used to perform both the remote memory access operation and the local memory access operation, and is widely applicable.

In an embodiment, the second orchestration operator includes at least one type of the following orchestration commands: a control command and a computation command. The control command is used to control the second network device, and the computation command is used to perform an arithmetic and/or logical operation on at least one operand.

In the foregoing embodiment of this application, to more flexibly express internal execution logic of a request generated by an application, and enable the orchestration operator to express both a static workflow diagram and a dynamic workflow diagram, the orchestration operator not only includes the memory access command. This is widely applicable.

In an embodiment, a type of the control command includes at least one of the following: a conditional jump command, a loop command, a wait command, a local orchestration operator call command, a remote orchestration operator call command, and an orchestration end command. The conditional jump command is used to jump to at least one first target orchestration command based on at least one variable parameter, for example, jumping to the at least one first target orchestration command based on a value of one variable parameter, a comparison result between two variable parameters, or a comparison result between one variable parameter and a constant, where the variable parameter is a parameter whose specific value is determined only when the orchestration command is executed. The loop command is used to cyclically execute at least one second target orchestration command for m times, where m≥1. The wait command is used to wait until execution of at least one third target orchestration command is completed. The local orchestration operator call command is used to asynchronously call a local orchestration operator. The remote orchestration operator call command is used to asynchronously call a remote orchestration operator. The orchestration end command is used to end execution of an orchestration context.

In the foregoing embodiment of this application, several typical command types included in the control command are specifically described. This can control an execution sequence and an execution process of the orchestration commands, and is controllable.

In a possible implementation of the third aspect, a type of the computation command includes at least one of the following: a binary arithmetic and/or logical computation command and a bit width conversion computation command. The binary arithmetic and/or logical computation command is used to obtain a first computation result based on two operands, and the bit width conversion computation command is used to convert a bit width of an operand, to obtain a second computation result.

In the foregoing embodiment of this application, several typical command types included in the computation command are specifically described, to express a computation process of the variable parameter.

In an embodiment, a type of the memory access command includes at least one of the following: a load command (which may also be referred to as a load command), a store command (which may also be referred to as a store command), a memory copy command (which may also be referred to as a memcpy command), a compare command (which may also be referred to as a memcmp command), a send/receive command (send/recv command), an atomic compare and swap command (which may also be referred to as an atomic compare and write command), an atomic add command (which may also be referred to as an atomic compare and add command), and an exclusive atomic command (which may also be referred to as an exclusive atomic command). The load command is used to fetch first data of a preset quantity of bytes from a local memory address, or fetch second data of a preset quantity of bytes from a remote memory address. The store command is used to write third data of a preset quantity of bytes into the local memory address, or write fourth data of a preset quantity of bytes into the remote memory address. The memory copy command is used to copy local or remote data. The compare command is used to compare local or remote data. The send/receive command is used to send/receive a two-sided message. The atomic compare and swap command is used to perform atomic swap with a comparison condition and a mask on fifth data of a preset quantity of bytes. The atomic add command is used to perform an atomic add operation with a comparison condition on sixth data of a preset quantity of bytes. The exclusive atomic command is used to obtain exclusive access permission for a local or remote memory address according to a cache coherence protocol.

In the foregoing embodiment of this application, several typical command types included in the memory access command are specifically described, to synchronously or asynchronously read/write memory data and perform message sending or an atomic operation. This is flexible.

According to a fourth aspect, an embodiment of this application provides a network device. The network device serves as a first network device, and has a function of performing the method in any one of the first aspect or the possible embodiments of the first aspect or a function of performing the method in any one of the second aspect or the possible embodiments of the second aspect. The function may be implemented by hardware, or may be implemented by hardware by executing corresponding software. The hardware or the software includes one or more modules corresponding to the function.

According to a fifth aspect, an embodiment of this application provides a network device. The network device serves as a second network device, and has a function of performing the method in any one of the third aspect or the possible embodiments of the third aspect. The function may be implemented by hardware, or may be implemented by hardware by executing corresponding software. The hardware or the software includes one or more modules corresponding to the function.

According to a sixth aspect, an embodiment of this application provides a network device, including a storage, a processor, and a bus system. The storage is configured to store a program. The processor is configured to call the program stored in the storage, to perform the method in any one of the first aspect or the possible implementations of the first aspect in embodiments of this application, the method in any one of the second aspect or the possible implementations of the second aspect in embodiments of this application, or the method in any one of the third aspect or the possible implementations of the third aspect in embodiments of this application.

According to a seventh aspect, an embodiment of this application provides a computer-readable storage medium. The computer-readable storage medium stores instructions, and when the computer-readable storage medium is run on a computer, the computer is enabled to perform the method in any one of the first aspect or the possible implementations of the first aspect, the method in any one of the second aspect or the possible implementations of the second aspect, or the method in any one of the third aspect or the possible implementations of the third aspect.

According to an eighth aspect, an embodiment of this application provides a computer program. When the computer program is run on a computer, the computer is enabled to perform the method in any one of the first aspect or the possible implementations of the first aspect, the method in any one of the second aspect or the possible implementations of the second aspect, or the method in any one of the third aspect or the possible implementations of the third aspect.

According to a ninth aspect, an embodiment of this application provides a chip. The chip includes at least one processor and at least one interface circuit, the interface circuit is coupled to the processor, and the at least one interface circuit is configured to perform receiving and sending functions, and send instructions to the at least one processor. The at least one processor is configured to run a computer program or instructions, and has a function of implementing the method in any one of the first aspect or the possible implementations of the first aspect, the method in any one of the second aspect or the possible implementations of the second aspect, or the method in any one of the third aspect or the possible implementations of the third aspect. The function may be implemented by using hardware, may be implemented by using software, or may be implemented by using a combination of hardware and software. The hardware or the software includes one or more modules corresponding to the foregoing functions. In addition, the interface circuit is configured to communicate with a module other than the chip.

DESCRIPTION OF EMBODIMENTS

Figure 1:
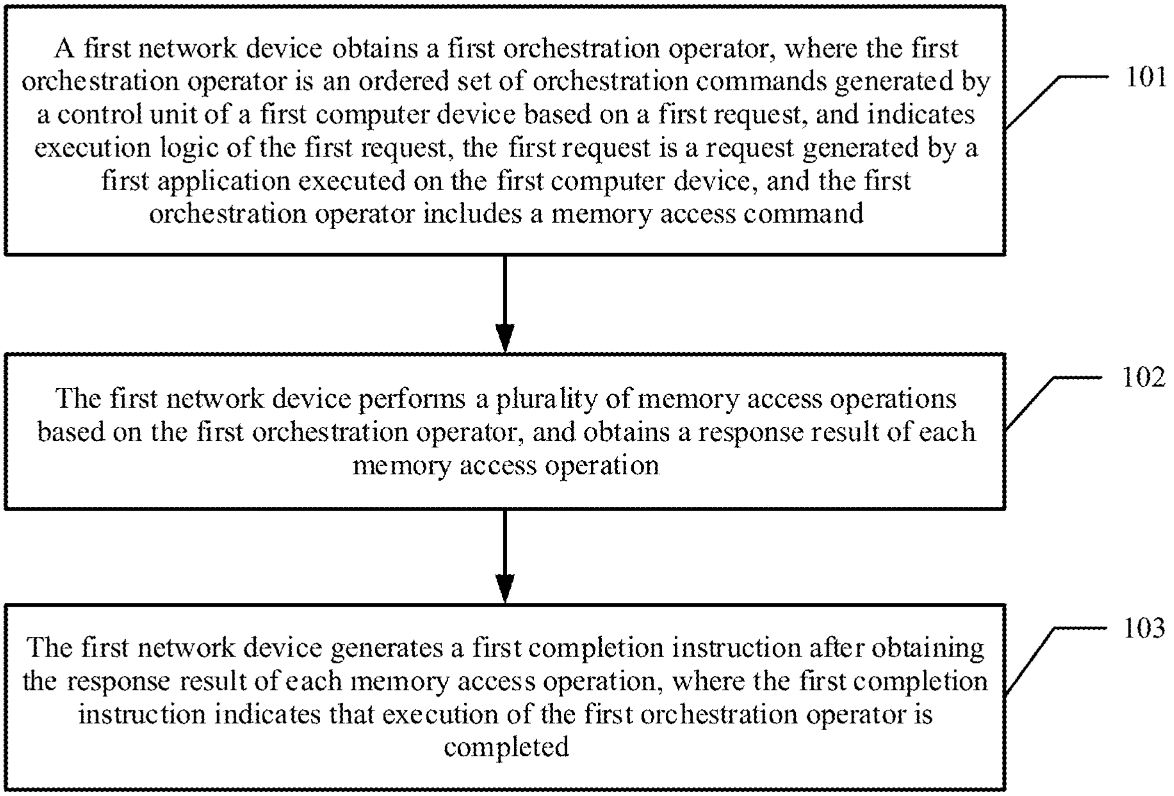
FIG. 1 is a schematic flowchart of a network device-based data processing method according to an embodiment of this application.

Embodiments of this application provide a network device-based data processing method and a network device, to construct a corresponding orchestration operator based on execution logic of a request generated by an application. A local first computer device only needs to send the orchestration operator to a local first network device via a control unit (for example, a CPU) for one time, and the local first network device performs parsing based on the orchestration operator, to obtain a corresponding memory access operation (which may be remote memory access or local memory access). After all memory access operations are completed, the local first network device reports a completion instruction to the control unit of the local first computer device. In this application, the constructed orchestration operator is used to execute user-programmable logic, to reduce a quantity of interactions between the control unit of the first computer device and the first network device. If the memory access operation is a remote memory access operation, a quantity of network round-trips for a distributed request can be further reduced. This prevents the control unit of the first computer device from being repeatedly interrupted by response results, and implements parallel computing and communication.

In the specification, claims, and the accompanying drawings of this application, terms “first”, “second”, and the like are intended to distinguish similar objects but do not necessarily indicate a specific order or sequence. It should be understood that the terms used in such a way are interchangeable in proper circumstances, which is merely a discrimination manner that is used when objects having a same attribute are described in embodiments of this application. In addition, the terms “include”, “have”, and any other variants mean to cover the non-exclusive inclusion, so that a process, method, system, product, or device that includes a series of units is not necessarily limited to those units, but may include other units not expressly listed or inherent to such a process, method, product, or device.

Embodiments of this application relate to much knowledge related to memory access. To better understand solutions in embodiments of this application, the following first describes related terms and concepts that may be used in embodiments of this application. It should be understood that, related concept explanation may be limited due to specific situations of embodiments of this application, but this does not mean that this application is limited to only these specific situations, and specific situations of different embodiments may differ. This is not specifically limited herein.

(1) Remote Direct Memory Access (RDMA)

RDMA is a direct memory access technology. Data is transmitted from a memory of a local computer device to a remote computer device without participation of operating systems (OS) of the two parties. Therefore, no impact is imposed on the OSs of the two parties, and few processing functions of computers are required. This eliminates overheads of external storage copying and context switching, to free up memory bandwidth and shorten a CPU cycle to improve application system performance.

(2) Direct Memory Access (DMA)

DMA is a technology used by a device (including but not limited to a network interface card) to access a host memory, and allows hardware apparatuses at different speeds to communicate with each other without relying on a large amount of interrupt load of a CPU. Otherwise, the CPU needs to copy information of each segment from a source to a scratchpad memory, and then write the information into a new location. During this period, the CPU cannot be used for other work.

(3) Network Device

Physically, a local area network, a metropolitan area network, and a wide area network each include a network connection device and a transmission medium, for example, a network interface card (NIC), a hub, a switch, a router, a network cable, and an RJ45 connector. The network device further includes a device like a repeater, a bridge, a router, a gateway, a firewall, or a switch.

Specifically, the network device and the component are physical entities connected to the network. There are various types of network devices, and a quantity of types is increasing. A type of the network device is not specifically limited in this application. However, it should be noted that, for ease of description, in embodiments of this application, an example in which the network device is a network interface card is used for illustration.

The network interface card is computer hardware designed to allow a computer to communicate on a computer network. The network interface card has a media access control (MAC) address, and is located between Layer 1 and Layer 2 of an open systems interconnection (OSI) model. The network interface card allows users to communicate with each other in a wireline or wireless manner.

It should be noted that, in embodiments of this application, in addition to a common network interface card, the network interface card may further include a data processing unit (DPU), a smart network interface card, an RDMA network interface card, or a device with a network interface card function in another form. This is not specifically limited in this application. For example, the RDMA network interface card is configured to: receive a remote memory access request from a CPU, and send the remote memory access request to a network; or receive a remote memory access request from a network, access a host memory via a DMA engine, and finally return an access result to an initiator through a network.

(4) Transaction Layer

The transaction layer is a hardware carrier that performs a basic remote memory access operation in the network device. For example, an RDMA transaction layer includes two operation manners:

a: Write Operation

The transaction layer is configured to: receive a remote memory write request from a local CPU, read data from a local memory via the DMA engine, and send the data to the network; receive a remote memory write request and data of the network from the network, write the remote memory write request and the data into a local memory via the DMA engine, and send a response to a remote end; or receive a response of a remote memory write request from the network, and generate a completion event to notify a local CPU.

b: Read Operation

The transaction layer is configured to: receive a remote memory read request from a local CPU, and send the remote memory read request to the network; receive a remote memory read request from the network, read data in a local memory via the DMA engine, generate a response packet, and send the response packet to the network; or receive a response of a remote memory read request from the network, write data into a local memory via the DMA engine, and generate a completion event to notify a local CPU.

(5) Orchestration Command

The orchestration command is a basic operation in orchestration, and includes a control command, a memory access command, and a computation command.

A field of the orchestration command may be a variable parameter. A typical scenario of the variable parameter is a value that can be determined only when an orchestration operator is executed, for example, a parameter that is of a current orchestration command and that depends on an execution result of a previous orchestration command, or a value of a specific address in a memory. A field in the orchestration command may be an immediate value, a value of an offset in a scratchpad, a value of a loop counter, a value of a memory address, or the like. Another field can only be an immediate value, which is referred to as an invariable parameter. A typical scenario of the immediate value is a value that can be determined when an orchestration operator is compiled, for example, a location of a memory region for access, a length of data, or the like.

(6) Orchestration Operator

The orchestration operator is a segment of code that implements a specific communication function (for example, a distributed communication function), is a group of ordered orchestration commands, and indicates execution logic of a request generated by a corresponding application.

In embodiments of this application, the orchestration operator may be executed in an orchestration unit of the network device. The orchestration unit is a hardware carrier that executes the orchestration operator, and may also be referred to as an orchestration engine (OE) in some embodiments. Each time the orchestration operator is called by a user application, execution on the orchestration unit is referred to as an orchestration task. An orchestration operator may be repeatedly called or may be executed in parallel.

It should be noted that, in embodiments of this application, one orchestration task correspondingly includes one or more memory access operations, which may be remote memory access or local memory access. This is not limited in this application.

(7) Orchestration Context

When executing the orchestration operator, the network device generates (for example, by using the orchestration unit) a temporary orchestration context used to store an intermediate status. The temporary orchestration context may include a private storage area, namely, a scratchpad, in which read and write may be performed by using the orchestration command. An orchestration task one-to-one corresponds to an orchestration context. Content of the orchestration context includes a caller of the orchestration operator, a pointer of a currently executed orchestration command, a counter of an asynchronously executed orchestration command, a location of a last orchestration command in the orchestration operator, a loop counter, a loop jump location, an intermediate variable in a process of executing the orchestration task, and the like.

(8) Variable Parameter

A field (for example, a field like an address or a length in a memory access command) whose specific value can be determined only when the orchestration command is executed, which may be an immediate value, a variable, a loop counter, or an expression thereof. This is not specifically limited in this application.

The variable parameter supports a parameter-based orchestration command, and is an important mechanism to support orchestration programmability. The variable parameter is used as a variable field in the orchestration command, for example, a variable address and a variable length in the memory access command, or a jump condition in the control command. The variable parameter may be one of the following variables:

a: a special variable result, indicating a return value of a previous synchronous orchestration command;

b: a special variable loop_counter, indicating a current loop counter (starting from 0 until a quantity of loops minus 1);

c: an outstanding counter;

d: a value of a specific offset in the scratchpad, where a bit width of the value is equal to a bit width of a field in the orchestration command; and e: an immediate value or a variable parameter that may be used by each address and length field of the memory access operation in the orchestration command. In flags, one bit is reserved for each address and length field, indicating whether a corresponding field is an immediate value or a variable parameter (in the following command descriptions, the bit is in orange). If variable parameters are used, −1, −2, and −3 respectively indicate the return value of the previous orchestration command, the loop counter, and the outstanding counter, and a non-negative integer indicates the offset (in bytes) in the scratchpad. If the offset is set to a value that exceeds a boundary or that is invalid, the orchestration operator is processed based on abnormal logic.

It should be noted that the value of the variable parameter is calculated when the orchestration command is executed, but an original orchestration command in the orchestration operator remains unchanged. Therefore, orchestration commands with variable parameters can be called cyclically or concurrently in different orchestration operators.

In addition, some orchestration commands can store the return value in the specified offset in the scratchpad. In this case, −1 indicates that the return value is not stored in the scratchpad, and a non-negative integer indicates the offset (in bytes) of the scratchpad. The return value of the previous orchestration command is automatically updated. The loop counter and outstanding counter cannot be forcibly written. If the offset is set to a value that exceeds a boundary or that is invalid, the orchestration operator is processed based on abnormal logic.

(9) Scratchpad

The scratchpad is a variable that stores the execution result of the orchestration command, is used to store the intermediate status of the orchestration operator, and can be used as a variable parameter.

(10) Local Orchestration

The local orchestration is a process of executing the orchestration operator on a network device (for example, a UBEP) of a host in which an initiator is located.

(11) Remote Orchestration

The remote orchestration is a process of executing the orchestration operator on a network device (for example, a UBEP) on a different host from an initiator.

(12) Program Count (PC) Pointer

A location of the currently executed orchestration command may be referred to as a PC pointer.

(13) Remote direct memory access over converged Ethernet (RoCE)

The RoCE is a network protocol that allows RDMA to be used on the Ethernet network. The ROCE has two versions: RoCEv1 and RoCEv2. The RoCEv1 is an Ethernet link layer protocol that allows any two hosts in a same Ethernet broadcast domain to communicate with each other. The RoCEv2 is a network layer protocol that allows routing of an RoCEv2 data packet. Although the ROCE protocol benefits from features of the converged Ethernet network, the protocol can also be used in the conventional or non-converged Ethernet network.

(14) InfiniBand (IB)

The IB is a computer-networking communication standard used in high-performance computing, features very high throughput and very low latency, and is used for data interconnection both among and within computer devices.

A set of primitives (namely, function abstraction) used for RDMA communication in an IB network is referred to as IBverbs. The set of primitives may be used to establish network communication between nodes in the IB network.

(15) Unified Bus (UB)

The UB is a next-generation data center network interconnection technology.

(16) Unified Remote Memory Access (URMA)

The URMA indicates a remote memory access operation, including load, store, read, write, and atomic operations.

(17) Unified Memory Development Kit (UMDK)

The UMDK is a memory-centered distributed development tool chain, including URMA basic semantics, orchestration, objects, and distributed transactions.

(18) Unified Bus Endpoint (UBEP)

The UBEP is a communication endpoint in the UB, and is a hardware module that initiates and receives a URMA request.

A unique address of each UBEP in the UB may be referred to as an endpoint identity (EID), and is used for addressing in a UB network. A unique address of namespace of each process in the UB may be referred to as a user address space identity (UASID), and is used for addressing a process in a host.

(19) Queue Pair Context (QPC)

The QPC is a context of a queue pair (QP). Each QP includes a send queue (SQ) and a receive queue (RQ).

(20) Work Queue (WQ)

The WQ includes an SQ (sender), an RQ (receiver), and a control queue (CQ). There are several types of operations: send, receive, write, and read. It is parsed and processed by using an asynchronous scheduling mechanism inside the RDMA network interface card.

A work queue element (WQE) is pointed to a buffer used to store data, and is placed in the send queue SQ or the receive queue RQ. A complete queue element (CQE) is placed in a completion queue (CQ). When processing of the WQE is completed, a corresponding CQE is generated.

In embodiments of this application, when execution of the orchestration task is completed, the CPU of the local computer device may be notified of a completion queue CQ of a CQE, namely, a completion event.

(21) Reliable Connection (RC)

The RC is a connection-oriented reliable transmission service, and is of a QP type. Reliable means that a message is delivered exactly once in an ordered way. In this case, the processing is completed by working with an ACK mechanism. An RC QP supports send, write, read, and atomic operations.

The following describes embodiments of this application with reference to the accompanying drawings. A person of ordinary skill in the art may know that, with development of technologies and emergence of a new scenario, technical solutions provided in embodiments of this application are also applicable to similar technical problems.

Based on specific implementations, a network device-based data processing method in embodiments of this application may be classified into local orchestration and remote orchestration, which are separately described below. It should be noted herein that, for ease of description, in the following embodiments of this application, an example in which a control unit of a first computer device or a second computer device is a CPU is used for description.

1. Local Orchestration

The local orchestration is a process of executing an orchestration operator on a network device (for example, the following first network device) of a host in which an initiator (for example, the following first computer device) is located. Specifically, FIG. 1 is a schematic flowchart of a network device-based data processing method according to an embodiment of this application. The method may include the following operations.

101: A first network device obtains a first orchestration operator, where the first orchestration operator is an ordered set of orchestration commands generated by a control unit of a first computer device based on a first request, and indicates execution logic of the first request, the first request is a request generated by a first application executed on the first computer device, and the first orchestration operator includes a memory access command.

Target software (which may be referred to as first software or the first application) executed on the first computer device generates a request (which may be referred to as the first request) in real time. The control unit of the first computer device (which is described below by using an example in which the control unit is a CPU) generates, based on the currently generated first request, an orchestration operator (which may be referred to as the first orchestration operator) corresponding to the first request. The first orchestration operator is a group of ordered code including the orchestration commands, which forms an ordered set of the orchestration commands indicating the execution logic of the corresponding first request. After the CPU of the first computer device constructs, based on the first request, the corresponding first orchestration operator, the first network device (for example, a first network interface card) corresponding to the first computer device obtains the first orchestration operator. Obtaining manners include but are not limited to:

Manner a: A storage area (for example, a DDR memory) may be preset as a storage area of an orchestration operator, and may be referred to as a first storage area, where the first storage area may be located in the first computer device, the first network device, or another third-party device. This is not specifically limited in this application. All orchestration operators generated by the CPU of the first computer device may be stored in the first storage area. Therefore, after generating the first orchestration operator, the CPU of the first computer device may store the first orchestration operator in the first storage area. When the first orchestration operator needs to be executed, the CPU of the first computer device additionally sends an execution instruction to the first network device. The execution instruction instructs the first network device to read a target orchestration operator from the first storage area. For example, it is assumed that the first execution instruction instructs the first network device to read the first orchestration operator from the first storage area. When receiving the first execution instruction sent by the CPU of the first computer device, the first network device reads the corresponding first orchestration operator from the first storage area. An advantage of the implementation is that when the first network device needs an orchestration operator, the orchestration operator may be called from the first storage area at any time according to an execution instruction, to save storage space of the first network device.

Manner b: After generating the first orchestration operator, the CPU of the first computer device directly sends the first orchestration operator to the first network device, that is, the first network device receives the first orchestration operator directly sent by the first computer device. Usually, a simple orchestration operator may be directly sent. This simplifies operation operations, and saves time in an overall execution process.

Figure 2:
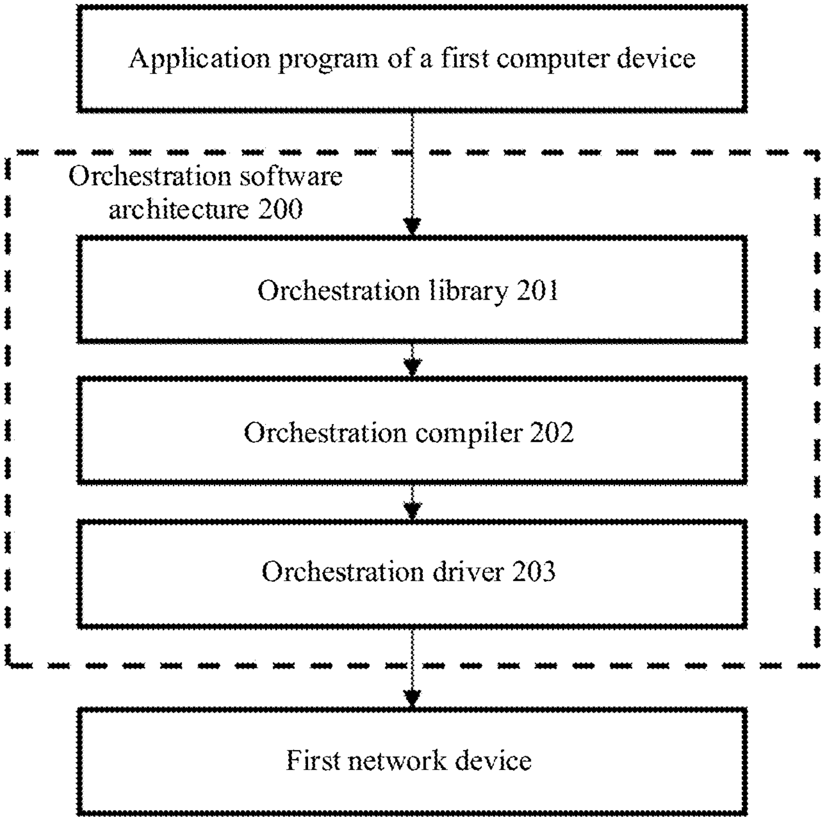
FIG. 2 is a diagram of a structure of an orchestration software architecture according to an embodiment of this application.

Specifically, in some embodiments of this application, the CPU of the first computer device may generate, based on an orchestration software architecture, an orchestration operator corresponding to a request. Specifically, FIG. 2 is a diagram of a structure of an orchestration software architecture according to an embodiment of this application. The orchestration software architecture is located in the CPU of the first computer device, and is a specific implementation in which the CPU obtains a corresponding orchestration operator based on a generated request. The orchestration software architecture 200 may include an orchestration library 201, an orchestration compiler 202, and an orchestration driver 203. The orchestration library 201 is a programming interface provided for a user. The orchestration compiler 202 is used to compile an orchestration command included in an orchestration operator into a hardware instruction that the first network device (for example, an orchestration unit of the first network device) needs. The orchestration driver 203 is used to deliver the compiled orchestration operator to the first network device (for example, the orchestration unit of the first network device) for execution.

It should be noted herein that a specific process of generating an orchestration operator is described by using the first computer device and the first network device as examples in FIG. 2. A process of generating an orchestration operator on another computer device and a corresponding network device is similar. Details are not described herein again.

Figure 3:
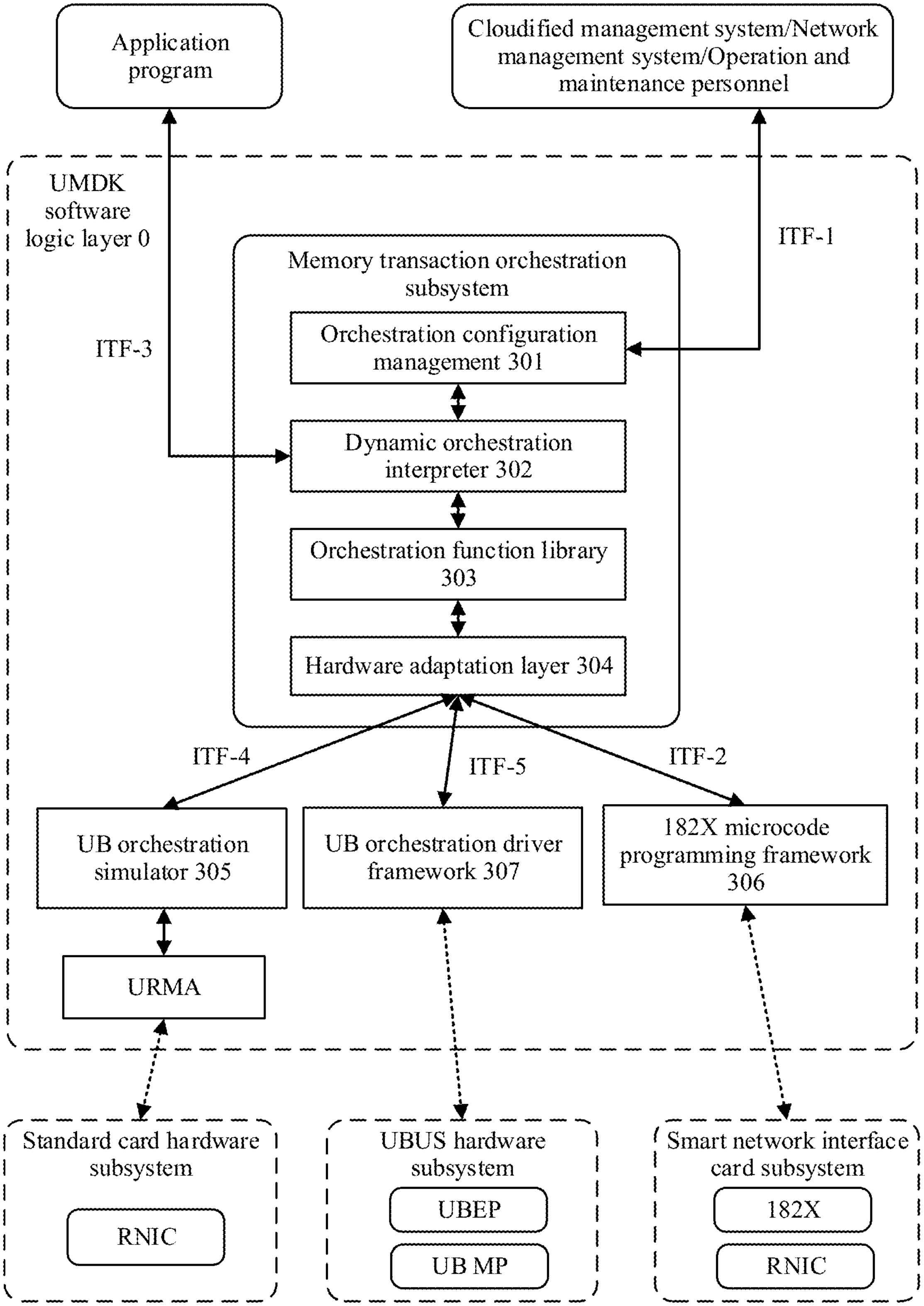
FIG. 3 is a diagram of an application of an orchestration software architecture according to an embodiment of this application.

For ease of understanding of the foregoing process, the following uses a specific implementation as an example for description. Specifically, FIG. 3 is a diagram of an application of an orchestration software architecture according to an embodiment of this application. In this application scenario, a memory request orchestration subsystem and a CPU-based orchestration simulator are implemented in a UMDK software framework. A UB MP subsystem is implemented in UBUS hardware, and the UB MP subsystem functions as a native hardware engine supporting orchestration. An orchestration subsystem is implemented in a 182X smart network interface card, and the orchestration subsystem implements a microcode-based orchestration unit. A relationship between the orchestration software architecture and a peripheral component is as follows.

An orchestration configuration management 301 is connected to a UB management plane, and has a capability of managing and discovering an orchestration unit.

A dynamic orchestration interpreter 302 is a high-layer application programming interface (API) for orchestration. A user may select a required programming language (for example, the C language) to write an orchestration program, and the dynamic orchestration interpreter 302 translates the orchestration program into an orchestration operator including orchestration commands.

An orchestration function library (liborach) 303 is a bottom-layer API for orchestration. An advanced user may call the bottom-layer API to directly generate each orchestration command. In addition, the orchestration function library 303 may further provide an API for executing an orchestration operator.

A hardware adaptation layer (orch_provider) 304 is configured to adapt to hardware platforms of different network devices such as a standard RDMA network interface card, a 182X network interface card, and UB hardware.

A UB orchestration simulator 305 is configured to: in an environment based on the standard RDMA network interface card, simulate a behavior of a UB hardware orchestration unit via a CPU, and perform a memory access operation corresponding to an orchestration operator. The UB orchestration simulator 305 calls a URMA library to convert a URMA operation into an API of the standard RDMA network interface card, to implement remote memory access and calling of a remote orchestration task.

A 182X microcode programming framework 306 is connected to a smart network interface card subsystem, and is connected to a 182X driver and hardware of the 182X network interface card. In a scenario including the 182X network interface card, an orchestration task is executed on microcode of the 182X network interface card without passing through the CPU during execution.

A UB orchestration driver framework 307 is connected to a UBUS hardware subsystem, and is configured to interact with a hardware orchestration unit in an environment based on the UB hardware orchestration unit to execute an orchestration task.

For example, in some embodiments of this application, a specific command may be executed by calling an API of the orchestration unit. Commands include but are not limited to:

(1) constructing an orchestration operator: int orch_init (orch_operator_t*operator);

(2) destroying an orchestration operator: void orch_uninit (orch_operator_t*operator);

(3) adding an orchestration command to an orchestration operator: int orch_append(orch_operator_t*operator, const orch_cmd_t*cmd);

(4) registering an orchestration operator with a local network device, to generate an orchestration operator number (tid) for a subsequent call by a local or remote network device: int orch_export (urma_context_t*urma_ctx, orch_operator_t*operator, orch_operator_id_t*tid);

(5) deleting the registered orchestration operator from the local network device: int orch_unexport (urma_context_t*urma_ctx, const orch_operator_id_t*tid);

(6) executing, in the local network device, the orchestration operator (tid) registered with the local network device, and using a specified send channel (jfs), completion event notification channel (jfc), and call parameter (param) of an orchestration operator:

int orch_execute_local(urma_context_t*urma_ctx, urma_jfs_t*jfs, urma_jfc_t*jfc, const orch_operator_id_t*tid, orch_local_param_t*param);

(7) executing, in a specified remote network device, an orchestration operator (tid) registered with the remote network device, and using a specified send channel (jfs), completion event notification channel (jfc), and call parameter (param) of an orchestration operator:

int orch_execute_remote(urma_context_t*urma_ctx, urma_jfs_t*jfs, urma_jfc_t*jfc, const orch_operator_id_t*tid, orch_remote_param_t*param);

(8) establishing a connection between the local network device and a specified remote network device (remote_eid, remote_uasid): int orch_import_remote (urma_context_t*urma_ctx, uint32_t remote_eid, uint32_t remote_uasid);

(9) allowing the local network device to access a memory region in the specified remote network device: int orch_advise_seg(urma_context_t*urma_ctx, const urma_target_seg_t *target_seg);

(10) registering a memory region with the local network device: int orch_register_tseg (urma_context_t*urma_ctx, urma_target_seg_t*seg); and

(11) waiting, on the specified completion event notification channel of the local network device, until execution of an orchestration operator is completed: int orch_poll_jfc(urma_jfc_t*jfc, uint32_t cr_cnt, urma_cr_t*cr).

It should be noted that, in some embodiments of this application, the first network device further generates an orchestration context (which may be referred to as a first orchestration context) corresponding to the first orchestration operator. The first orchestration context is used to store an intermediate status of an orchestration task (namely, a memory access operation) during execution.

It should be further noted that, in some embodiments of this application, content of the orchestration context may include at least one of the following: a caller of the orchestration operator, a pointer of a currently executed orchestration command, a counter of an asynchronously executed orchestration command, a location of a last orchestration command in the orchestration operator, a loop counter, a loop jump location, an intermediate variable in a process of executing the orchestration task, and the like. For example, the first orchestration context may include at least one of the following: a caller (namely, the first computer device) of the first orchestration operator, a pointer of a currently executed orchestration command, a counter of an asynchronously executed orchestration command, a location of a last orchestration command in the orchestration operator, a loop counter, a loop jump location, an intermediate variable in a process of executing the orchestration task, and the like.

It should be noted that, in some embodiments of this application, a manner of generating the first orchestration context varies with a manner in which the first network device obtains the first orchestration operator from the first computer device. For example, it is assumed that the manner in which the first network device obtains the first orchestration operator from the first computer device is the manner a. In this case, when receiving the first execution instruction sent by the first computer device via the CPU, the first network device triggers generation of the first orchestration context. It is assumed that the manner in which the first network device obtains the first orchestration operator from the first computer device is the manner b. In this case, when receiving the first orchestration operator sent by the first computer device via the CPU, the first network device triggers generation of the first orchestration context.

For example, in some embodiments of this application, a manner in which the first network device generates the first orchestration context may be as follows: when starting to execute the first orchestration operator, the first network device allocates an idle orchestration context from an orchestration context pool, and initializes a scratchpad in the orchestration context by using a parameter specified by the first software. Then, the first orchestration operator is used to store an intermediate status during execution of the orchestration operator.

It should be further noted that, in embodiments of this application, because the orchestration operator is used to perform memory access, the orchestration commands forming the first orchestration operator need to include the memory access command, and the memory access command indicates a type of a memory access operation. In addition, it should be further noted that, in some embodiments of this application, to more flexibly express internal execution logic of a request generated by an application, and enable the orchestration operator to express both a static workflow diagram and a dynamic workflow diagram, in addition to including the memory access command, the orchestration operator may further include at least one type of the following orchestration commands: a control command and a computation command. The control command is used to control the first network device, and the computation command is used to perform an arithmetic and/or logical operation on at least one operand.

It should be noted that, in some embodiments of this application, the memory access command, the computation command, and the control command may have different representation forms based on specific functions. For example, the following separately describes definitions of different orchestration commands.

A: Control Command

In some embodiments of this application, a type of the control command includes at least one of the following: a conditional jump command, a loop command, a wait command, a local orchestration operator call command, a remote orchestration operator call command, and an orchestration end command. For specific meanings of the command types, refer to Table 1.

TABLE 1

Meanings of different control command types

| Control command | Meaning |
|---|---|
| Conditional jump command | Skip n subsequent orchestration commands based on at least one variable parameter, where n ≥ 1 |
| Loop command | Cyclically execute N orchestration commands for m times after the loop command, where N ≥ 1, m ≥ 1, the loop may be jumped out by using the conditional jump command, and nesting is not allowed in the loop command |
| Wait command | Wait until execution of one or more (or all) orchestration commands is completed |
| Local orchestration call command | Asynchronously call a local orchestration operator |
| Remote orchestration call command | Asynchronously call a remote orchestration operator |
| Orchestration end command | End execution of an orchestration context |

a: Conditional Jump Command

The conditional jump command is used to skip n subsequent orchestration commands based on at least one variable parameter, where n≥1. For example, the conditional jump command may be used to skip the n subsequent orchestration commands based on a value of one variable parameter, a comparison result between two variable parameters, or a comparison result between one variable parameter and a constant. The semantics of the conditional jump command is jumping to a specified orchestration command when a comparison condition of two parameters is met. If the comparison condition is not met, a next orchestration command is executed.

It should be noted that, for the conditional jump command in embodiments of this application, the following points need to be noted:

(1) The conditional jump command only allows jumping in a direction in which a PC pointer (address of a currently executed orchestration command) increases, to avoid an uncontrolled loop. An offset, of a true pointer, relative to the current orchestration command is calculated based on a quantity of orchestration commands (instead of a quantity of bytes) because a length of each orchestration command is fixed.

(2) "Special jump offset-1" indicates that execution of an orchestration task ends.

(3) The comparison condition may include cases such as less than, less than or equal to, equal, and unequal.

(4) Two operands that are compared may be immediate values or variable parameters, where the variable parameter is a parameter whose specific value can be determined only when the orchestration command is executed.

(5) A return value of the conditional jump command inherits a return value of a previous orchestration command, that is, the return value remains unchanged, so that an earliest return value can be reused for nested condition determining.

For example, if the return value of the previous orchestration command is 0, next five commands are skipped.

orch_cmdcmd;
cmd.opcode=UB_ORCH_COND_JUMP;
cmd.flags=ORCH_OPERAND1_IS_VAR;
cmd.cond_jump.operand1=ORCH_VAR_RETVAL;
cmd.cond_jump.operand2=0;
cmd.cond_jump.opcode=ORCH_ARITH_EQ;
cmd.cond_jump.jump_offset=5;

b: Loop Command

The loop command is used to cyclically execute at least one target orchestration command (which may be referred to as a first target orchestration command, for example, N orchestration commands after the first target command) for m times, where m≥1, and N≥1.

It should also be noted that, for the loop command in embodiments of this application, the following points need to be noted:

(1) A quantity of cycles and a length of a loop are specified by parameters (a quantity of cycles may be a variable parameter, and the length of the loop can only be a constant).

(2) A maximum quantity of execution times can be configured on the management plane, to avoid a loop whose execution time cannot be controlled or an infinite loop. When the quantity of cycles exceeds a threshold, orchestration execution is terminated and an anomaly is reported.

(3) After an orchestration command at a location whose address is a current location plus a loop length is executed, the loop automatically jumps back to the beginning of the loop.

(4) If the loop needs to be ended (break), the conditional jump command may be used, and the loop ends after a loop boundary is broken.

(5) Nesting is not allowed in the loop. If nesting is required in service logic, the user may use a loop flattening method to flatten the loop.

(6) When the loop starts, the loop counter is set to 0. The counter is increased by 1 each time the loop is performed for one iteration. When the loop counter reaches the specified quantity of cycles, the loop is not executed, but an orchestration command after the loop is directly jumped to. Outside the loop, a value of the loop counter remains unchanged. Therefore, the orchestration command after the loop may determine, based on the loop counter, a quantity of times that the loop is executed and whether the loop is jumped out.

(7) A return value of the loop command inherits a return value of a previous orchestration command, that is, the return value remains unchanged.

Example 1: Subsequent five commands are repeatedly executed for 10 times.

orch_cmdcmd;
cmd.opcode=UB_ORCH_LOOP;
cmd.flags=0;
cmd.loop.num_iters=10;
cmd.loop.num_cmds=5;

Example 2: Subsequent five commands are repeatedly executed, where a quantity of iterations is determined based on a value at a location whose address is 8 in the scratchpad.

orch_cmdcmd;
cmd.opcode=UB_ORCH_LOOP;
cmd.flags=ORCH_NUM_ITERS_IS_VAR;
cmd.loop.num_iters=8;
cmd.loop.cmd_cmds=5;

c: Wait Command

The wait command is used to wait until execution of at least one third target orchestration command is completed. The semantics of the wait command is enabling the orchestration operator to wait until execution of a specified quantity of asynchronous orchestration commands is completed, and not executing an orchestration command after the wait command during waiting. If the execution is not completed when a timeout indicated by timeout (a field in a packet format of the wait command) is reached, it is considered that the orchestration execution is abnormal.

It should also be noted that, for the wait command in embodiments of this application, the following points need to be noted.

(1) A meaning of outstanding_threshold (a field in the wait command of a packet format) is that a quantity of asynchronous orchestration commands that are waited for and that are being executed does not exceed a threshold. The threshold is a variable parameter. If the threshold is set to 0, it indicates to wait until execution of all asynchronous orchestration commands is completed. When the wait command is executed, if a quantity of asynchronous orchestration commands that are being executed does not exceed the threshold, waiting is not required.

(2) The wait command is implemented by using an outstanding counter. A value is increased by 1 each time an asynchronous orchestration command is sent, and decreased by 1 each time an asynchronous orchestration command is received. When the value is decreased to outstanding_threshold, waiting ends.

(3) A return value of the wait command is as follows: if a return value of an asynchronous orchestration command is returned without any waiting, the return value is 0. If a return value of an asynchronous orchestration command is returned after at least one asynchronous orchestration command is waited, the return value is a return value of a last asynchronous orchestration command.

(4) Currently, waiting until a specific orchestration command is completed is not supported.

Example 1: Execution of all asynchronous orchestration commands is waited for completion, where a timeout is 100 microseconds.

orch_cmdcmd;
cmd.opcode=UB_ORCH_WAIT;
cmd.flags=0;
cmd.wait.outstanding_threshold=0;
cmd.wait.timeout=100;

Example 2: Execution of at least three of five orchestration commands sent asynchronously is waited for completion (for example, returned if execution of more than half of the orchestration commands is completed), that is, outstanding_threshold is set to 5−3=2, where a timeout is 100 microseconds. An application program knows how many asynchronous orchestration commands that are sent, and at least how many asynchronous orchestration commands that are waited for completion, so that the threshold can be set. However, the command cannot be simply designed as "waiting until a specified quantity of asynchronous orchestration commands are completed". A reason lies in that execution of a previous asynchronous orchestration command may end before the wait command is sent. In this case, the command can never be completed.

```
orch_cmdcmd;
cmd.opcode=UB_ORCH_WAIT;
cmd.flags=0;
cmd.wait.outstanding_threshold=2;
cmd.wait.timeout=100;
```

d: Local Orchestration Operator Call Command

The local orchestration operator call command is used to asynchronously call a local orchestration operator. The semantics of the local orchestration operator call command is executing, in the local network device, an orchestration operator stored in a specified local memory address.

It should also be noted that, for the local orchestration operator call command in embodiments of this application, the following points need to be noted:

(1) To facilitate reusing of an orchestration operator, the local orchestration operator call command is allowed to carry a small amount of data. An address and a length of a scratchpad to which an initial value needs to be transferred are specified, a called orchestration context initializes a start part of the scratchpad to content of an orchestration context of a caller at a moment of executing the local orchestration operator call command, and another part is initialized to 0.

(2) A local orchestration operator call is an asynchronous operation, and one orchestration context can call a plurality of local orchestration operators in parallel. Each time an orchestration operator is called, a new orchestration context is generated. Therefore, the orchestration context of the caller can be executed independently, and the orchestration operator call can be nested. The outstanding counter is increased by 1 each time an orchestration operator is sent. Therefore, the wait command can be used for waiting, which is the same as a common asynchronous URMA operation.

(3) A return value of the local orchestration operator call command is a return value specified by an orchestration end command of the called orchestration context. If the called orchestration context does not call the orchestration end command, the return value is 0.

For example, an orchestration operator whose initial address is located at a memory address 0x100000 is asynchronously called, and is executed in the local network device. The orchestration operator includes 10 orchestration commands, an initial scratchpad is initialized via a memory location 0x200000, and an orchestration execution result is stored in a completion record specified by 0x300000.

```
orch_cmdcmd;
cmd.opcode=UB_ORCH_CALL_LOCAL;
cmd.flags=0;
cmd.call_local.cmdlist_addr=0x100000;
cmd.call_local.init_scratchpad_addr=0x200000;
cmd.call_local.cplt_record_addr=0x300000;
cmd.call_local.num_cmds=10;
```

e: Remote Orchestration Operator Call Command

The remote orchestration operator call command is used to asynchronously call a remote orchestration operator. The semantics of the remote orchestration operator call command is executing, in a specified remote network device, an orchestration operator stored in a specified memory address (a local or remote memory address).

It should also be noted that, for the remote orchestration operator call command in embodiments of this application, the following points need to be noted:

(1) To facilitate reusing of an orchestration operator, the orchestration call command is allowed to carry a small amount of data. An address and a length of a scratchpad to which an initial value needs to be transferred are specified, a called orchestration context initializes a start part of the scratchpad to content of an orchestration context of a caller at a moment of executing the remote orchestration operator call command, and another part is initialized to 0.

(2) A remote orchestration operator call is an asynchronous operation, and one orchestration context can call a plurality of remote orchestration operators in parallel. Each time an orchestration operator is called, a new orchestration context is generated. Therefore, the orchestration context of the caller can be executed independently, and the orchestration operator call can be nested. The outstanding counter is increased by 1 each time an orchestration operator is sent. Therefore, the wait command can be used for waiting, which is the same as a common asynchronous URMA operation.

(3) If a segment at which a specified memory address is located and a remote EID are on a same network device, the orchestration operator call command needs to be sent only through the network, and the orchestration operator does not need to be transmitted through the network.

(4) If the specified memory address is a local address, a command sent through the network is an orchestration operator call command with an orchestration operator, that is, the orchestration operator is transmitted to the remote network device through the network, and the remote network device allocates a buffer and executes the orchestration operator. If the buffer of the remote network device is insufficient during execution, some orchestration operators may be discarded. When an orchestration command that is not buffered is executed, a URMA read command is used to read some orchestration commands.

(5) If the specified memory address is not a local address, and the segment at which the specified memory address is located and the remote EID are not on a same network device, the orchestration operator call command is sent through the network, and the remote EID uses the URMA read command to read an orchestration operator as required during execution of the orchestration operator.

(6) A return value of the remote orchestration operator call command is a return value specified by an orchestration end command of the called orchestration context. If the called orchestration context does not call the orchestration end command, the return value is 0.

For example, an orchestration operator whose initial address is located at a UBVA of {EID=1234, UASID=1, VA=0x100000} is asynchronously called, and is executed on a node whose EID is 1234. The orchestration operator includes 10 orchestration commands, an initial scratchpad is initialized via a memory location 0x200000, and an execution result of the orchestration command is stored in a completion record specified by 0x300000.

```
orch_cmdcmd;
cmd.opcode=UB_ORCH_CALL_REMOTE;
cmd.flags=0;
cmd.call_remote.cmdlist_addr.eid=1234;
cmd.call_remote.cmdlist_addr.uasid=1;
cmd.call_remote.cmdlist_addr.va=0x100000;
cmd.call_remote.init_scratchpad_addr=0x200000;
cmd.call_remote.cplt_record_addr=0x300000;
cmd.call_remote.num_cmds=10;
cmd.call_remote.remote_eid=1234;
```

f: Orchestration End Command

The orchestration end command is used to end execution of an orchestration context.

No new orchestration command is sent after the orchestration end command.

It should also be noted that, for the orchestration end command in embodiments of this application, the following points need to be noted:

(1) If execution of an asynchronous orchestration command is not completed when the orchestration command is executed, the orchestration context waits until all asynchronous orchestration commands are completed.

(2) A return value, a write-back scratchpad bitmap, and an increment scratchpad bitmap are three parameters that are used to return information to the caller during a local or remote orchestration operator call.

(3) The return value is a variable parameter. If current orchestration is initiated by the CPU, the return value is represented in the CQE. If the current orchestration is called by another orchestration operator, the return value is used as a return value of the local or remote orchestration operator call command.

(4) The write-back scratchpad bitmap is used to copy a specified byte (which is specified by the bitmap, where each bit corresponds to a byte) in a current scratchpad to a corresponding location in a scratchpad of the orchestration caller. Because an orchestration call is asynchronous, the caller usually needs to leave locations of the bytes in the write-back scratchpad bitmap empty for the caller to write.

(5) The increment scratchpad bitmap is used to atomically increment a value of a corresponding field in the current scratchpad to a value of a field specified by the scratchpad of the orchestration caller. The field is specified by the bitmap, each bit corresponds to a byte, and a quantity of bits whose value is 1 needs to be 0 or 2. If the quantity of bits is 0, it indicates that increment is not performed. If the quantity of bits is 2, a first bit whose value is 1 indicates the most significant byte of the field, and a second bit whose value is 1 indicates the least significant byte of the field. A width of the field cannot exceed 8 bytes, and is processed as a signed integer. The increment scratchpad bitmap is usually used by the orchestration caller to aggregate orchestration execution results of a plurality of callees.

(6) Bytes modified by the write-back scratchpad bitmap and the increment scratchpad bitmap are not allowed to overlap.

(7) If orchestration is initiated by the CPU, memory content of the initial scratchpad is modified based on the semantics of the write-back scratchpad bitmap and the increment scratchpad bitmap. The memory content of the initial scratchpad is copied to the orchestration context when the orchestration starts, and is not synchronized with the memory in real time. Therefore, the write-back scratchpad bitmap needs to be used to obtain final content of the scratchpad.

For example, the orchestration ends, the return value is 1, content of 8 to 15 bytes in the scratchpad is written back to the scratchpad of the initiator, and a completion result is written to the memory region at a location 0x100000.

```
orch_cmdcmd;
cmd.opcode=UB_ORCH_RET;
cmd.flags=0;
cmd.ret.cplt_record_addr=0x100000;
cmd.ret.retval=1;
cmd.ret.wb_bitmap=0xff00;
cmd.ret.inc_bitmap=0;
```

B: Computation Command

In some embodiments of this application, a type of the computation command includes at least one of the following: a binary arithmetic and/or logical computation command and a bit width conversion computation command. For specific meanings of the command types, refer to Table 2.

TABLE 2

Meanings of different computation command types

| Computation command | Meaning |
|---|---|
| Binary arithmetic and/or logical computation command | A computation result is obtained based on two operands and is optionally stored in a scratchpad |
| Bit width conversion computation command | A computation result is obtained by converting a bit width of an operand and is optionally stored in the scratchpad |

a: Binary Arithmetic and/or Logical Computation Command

The binary arithmetic and/or logical computation command is used to obtain a first computation result based on two operands. The semantics of the binary arithmetic and/or logical computation command is calculating two operands (both can be immediate values or variable parameters) and a computation result may be stored in a specified offset in the scratchpad.

It should be noted that, for the binary arithmetic and/or logical computation command in embodiments of this application, the following points need to be noted:

(1) A computation type (e.g., arith type parameter) may include any one of addition, subtraction, multiplication, division, modulo, left shift, right shift, and bitwise AND/OR/XOR. This is not specifically limited in this application.

(2) The binary arithmetic and/or logical computation command supports computation of 8-bit, 16-bit, 32-bit, and 64-bit signed/unsigned integers (operand type parameter, including a bit width of 2 bits and 1 bit indicating signed/unsigned) or computation of a floating-point number.

(3) A return value of the binary arithmetic and/or logical computation command is the computation result.

(4) Because common monocular arithmetic and/or logical computation commands (bitwise negation, negative, increment, decrement, and forced type conversion) can be implemented via the binary arithmetic and/or logical computation command, a monocular arithmetic and/or logical computation command is not designed separately.

For example, the loop counter and the result of the previous orchestration command are multiplied, and a result is stored at a location with an offset of 8 in the scratchpad.

```
orch_cmdcmd;
cmd.opcode=UB_ORCH_ARITH;
cmd.flags=ORCH_OPERAND1_IS_
    VAR|ORCH_OPERAND2_IS_VAR|ORCH_
    OPERAND_IS_UINT64;
cmd.arith.opcode=UB_ARITH_MUL;
cmd.arith.operand1=-2; // loop counter
cmd.arith.operand2=-1; // return value of last command
cmd.arith.result_offset=8; // offset in scratchpad
```

b: Bit Width Conversion Computation Command

The bit width conversion computation command is used to convert a bit width of an operand, to obtain a second computation result.

It should also be noted that, for the bit width conversion computation command in embodiments of this application, the following points need to be noted:

(1) One operand (which may be an immediate value or a variable parameter) is calculated, and a computation result may be stored in a specified offset in the scratchpad.

(2) Operands and destination results of the bit width conversion computation command supports 8-bit, 16-bit, 32-bit, and 64-bit signed/unsigned integers (destination type and source type parameters, each including a bit width of 2 bits and 1 bit indicating signed/unsigned) or a floating-point number.

For example, UINT16 type data stored in 8 and 9 bytes in the scratchpad is converted into INT64 type data, and a result is stored in 16 to 23 bytes in the scratchpad.

```
orch_cmdcmd;
cmd.opcode=UB_ORCH_CONVERT;
cmd.flags=ORCH_OPERAND_IS_VAR;
cmd.convert.src_type=ORCH_TYPE_UINT16;
cmd.convert.dst_type=ORCH_TYPE_INT64;
cmd.convert.operand=8;
cmd.convert.result_offset=16;
```

C: Memory Access Command

In some embodiments of this application, a type of the memory access command includes at least one of the following: a load command (which may also be referred to as a load command), a store command (which may also be referred to as a store command), a memory copy command (which may also be referred to as a memcpy command), a compare command (which may also be referred to as a memcmp command), a send/receive command (send/recv command), an atomic compare and swap command (which may also be referred to as an atomic compare and write command), an atomic add command (which may also be referred to as an atomic compare and add command), and an exclusive atomic command (which may also be referred to as an exclusive atomic command). For specific meanings of the command types, refer to Table 3.

TABLE 3

Meanings of different memory access command types

| Memory access command | Meaning |
|---|---|
| load command | Synchronously read 1/2/4/8-byte data from a local or remote memory address |
| store command | Synchronously write 1/2/4/8-byte data into the local or remote memory address |
| memcpy command | Asynchronously implement a copy operation (including a read/write capability) of local or remote data that may exceed a maximum transmission unit (MTU) |
| memcmp command | Asynchronously implement a comparison operation of the local or remote data that may exceed the MTU |
| send/recv command | Asynchronously implement a send/receive operation of a two-sided message that may exceed the MTU |
| atomic compare and write command | Asynchronously implement atomic swap with a comparison condition and a mask on a data block in the MTU |
| atomic compare and add command | Asynchronously implement atomic add operation with a comparison condition on 1/2/4/8-byte data |
| exclusive atomic command | Obtain exclusive access permission for a local or remote memory address according to a cache coherence protocol |

a: Load Command

The load command, namely, a load command, is used to fetch first data of a preset quantity of bytes from a local memory address, or fetch second data of a preset quantity of bytes from a remote memory address. The load command is a synchronous or asynchronous command (specified by flags), and is used to read data from a specified source address to a last operation result or store the data to a specified location in the scratchpad.

It should be noted that, for the load command in embodiments of this application, the following points need to be noted:

(1) The source address may be a local address or a remote address. The source address may be an immediate value or a variable parameter.

(2) An operand of the load command may be 1 byte, 2 bytes, 4 bytes, or 8 bytes based on parameters in flags. This is not specifically limited in this application.

(3) A return value of the load command is the read data.

For example, 8-byte data whose UBVA is {EID=1234, UASID=1, VA=0x10000} is read to a location with an offset of 24 in the scratchpad.

```
orch_cmdcmd;
cmd.opcode=UB_LOAD;
cmd.flags=ORCH_LOAD_8B;
cmd.load.src_addr.eid=1234;
cmd.load.src_addr.uasid=1;
cmd.load.src_addr.va=0x10000;
cmd.load.result_offset=24;
```

b: Store Command

The store command, namely, a store command, is used to write third data of a preset quantity of bytes into the local memory address, or write fourth data of a preset quantity of bytes into the remote memory address. The store command is a synchronous or asynchronous command (specified by flags), and is used to store an immediate value or a variable parameter to a specified target address.

It should be noted that, for the store command in embodiments of this application, the following points need to be noted:

(1) The destination address may be a local address or a remote address. The destination address may be an immediate value or a variable parameter.

(2) An operand of the store command may be 1 byte, 2 bytes, 4 bytes, or 8 bytes based on parameters in flags. This is not specifically limited in this application.

(3) A return value of the store command is a return value of a previous orchestration command, that is, the return value remains unchanged.

For example, an execution result of the previous orchestration command is stored at a location whose UBVA is {EID=1234, UASID=1, VA=0x10000}, and a data length is 4 bytes.

```
orch_cmdcmd;
cmd.opcode=UB_STORE;
cmd.flags=ORCH_VALUE_IS_VAR|ORCH_STORE_4B;
cmd.store.dst_addr.eid=1234;
cmd.store.dst_addr.uasid=1;
cmd.store.dst_addr.va=0x10000;
cmd.store.value=-1;
```

c: Memcpy Command

The memcpy command, namely, a memory copy command, is used to copy local or remote data. The memcpy command is an asynchronous orchestration command. For a command format, refer to a URMA read WQE format. Details are not described in this application.

It should be noted that, for the memcpy command in embodiments of this application, the following points need to be noted:

(1) A destination address, a source address, and a length may be immediate values or variable parameters.

(2) Both the source address and the destination address may be local or remote addresses. Therefore, the memcpy command includes the semantics of URMA read and write. The concept of "local" or "remote" depends on where the orchestration command is executed. An address of the host where the orchestration command executor is located is referred to as the local address, and another address is referred to as the remote address. For example, in remote orchestration, an address of an orchestration executor is a local address, an address of an orchestration initiator is a remote address, and an address of any third host is also a remote address.

(3) The memcpy command automatically determines hosts on which the destination address and source address are located, and performs separate processing:

① If both the destination address and the source address are local addresses, local DMA is used for copying.

② If the destination address is the local address and the source address is the remote address, a URMA read transport layer primitive is used to transmit remote data to the local end.

③ If the destination address is the remote address and the source address is the local address, a URMA write transport layer primitive is used to transmit local data to the remote end.

④ If both the destination address and the source address are remote addresses, a local buffer area is created, the URMA read transport layer primitive is used to transmit data at the source address to the local buffer area, and the URMA write transport layer primitive is used to transmit data of the local buffer area to the destination address. If an amount of data to be transmitted is small, the buffer area is on a chip; otherwise, the buffer area is on a DDR. If the amount of data to be transmitted is large, the data is transmitted in slices, to reduce a required buffer area size, and input and output the data via a pipeline.

(4) The local address may be a virtual address of a process, or may be an offset in the orchestration scratchpad, and may be indicated by 2 bits in flags.

(5) It is required that ranges copied from the source address and the destination address do not overlap, and the ranges of data copied from the source address and the destination address cannot cross a segment boundary.

(6) A return value of the memcpy command is 0.

Example 1: 1024-byte data at a location whose UBVA is {EID=1234, UASID=1, VA-0x10000} is copied to a location whose UBVA is {EID=4321, UASID=2, VA=0x20000}.

```
orch_cmdcmd;
cmd.opcode=UB_MEMCOPY; // memcopy instead of memcpy is used as a name in code because memcpy is considered as a dangerous function by a gate
cmd.flags=0;
cmd.memcopy.src_addr.eid=1234;
cmd.memcopy.src_addr.uasid=1;
cmd.memcopy.src_addr.va=0x10000;
cmd.memcopy.dst_addr.eid=4321;
cmd.memcopy.dst_addr.uasid=2;
cmd.memcopy.dst_addr.va=0x20000;
cmd.memcopy.len=1024;
```

Example 2: A parameterized memcopy command is used to copy data from a location whose UBVA is {EID=1234, UASID=1, VA=location whose address is 8 in the scratchpad} to a location whose UBVA is {EID=4321, UASID=2, VA=location whose address is 16 in the scratchpad}, and a length of the copied data is located at a location whose address is 24 in the scratchpad.

```
orch_cmdcmd;
cmd.opcode=UB_MEMCOPY;
cmd.flags=ORCH_SRC_ADDR_IS_VAR|ORCH_DST_ADDR_IS_VAR|ORCH
  N_IS_VAR;
cmd.memcopy.src_addr.eid=1234;
cmd.memcopy.src_addr.uasid=1;
cmd.memcopy.src_addr.va=8;
cmd.memcopy.dst_addr.eid=4321;
cmd.memcopy.dst_addr.uasid=2;
cmd.memcopy.dst_addr.va=16;
cmd.memcopy.len=24;
```

d: memcmp Command

The memcmp command, namely a compare command, is used to compare local or remote data. The memcmp command is a synchronous or asynchronous orchestration command, and whether the command is synchronous or asynchronous is specified by flags. For an orchestration command format, refer to a URMA read WQE format. Details are not described in this application.

It should be noted that, for the memcmp command in embodiments of this application, the following points need to be noted:

(1) A destination address, a source address, and a length may be immediate values or variable parameters.

(2) The destination address and the source address may be local addresses or remote addresses.

(3) The memcmp command automatically determines hosts on which the destination address and source address are located, and performs separate processing:

① If both the destination address and the source address are local addresses, local DMA is used to load data into the memory for comparison.

② If either the destination address or the source address is the remote address, a URMA read transport layer primitive is used to transmit remote data to the local end, and the data is compared with the data in the local DMA.

③ If the destination address and the source address are remote addresses, the URMA read transport layer primitive is used to transmit data at the two remote addresses to a local buffer area for comparison. If an amount of data to be transmitted is small, the buffer area is on a chip; otherwise, the buffer area is on a DDR. If the amount of data to be transmitted is large, the data is transmitted in slices, to reduce a required buffer area size.

(4) The local address may be a virtual address of a process, or may be an offset in the orchestration scratchpad, and may be indicated by 2 bits in flags.

(5) A return value of the memcmp command indicates whether two memory segments are the same byte by byte. If the two memory segments are the same, the return value is 0. If the two memory segments are different, the return value depends on a difference between values of first different bytes. If a value of the destination address is smaller than a value of the source address, the return value is −1. If a value of the destination address is greater than a value of the source address, the return value is −2. Two negative numbers instead of one positive number and one negative number are used to determine whether memory segments are the same based on a sum during concurrent operations.

(6) For the asynchronous memcmp operation, an offset in the scratchpad may be specified, to perform increment on the received return value. When the asynchronous atomic operation is returned, a value of offset in the scratchpad is atomically added to the return value. This function is used to calculate a quantity of identical memory regions when a plurality of memory regions are compared concurrently.

Example: Comparison is performed on 1024-byte data at a location whose UBVA is {EID=1234, UASID=1, VA=0x10000} and a location whose UBVA is {EID=4321, UASID=2, VA=0x20000}, and an execution result is placed at a location whose address is 24 in the scratchpad.

```
orch_cmdcmd;
cmd.opcode=UB_MEMCOMP; // memcomp instead of memcmp is used as a name in code because memcmp is considered as a dangerous function by a gate
cmd.flags=0;
cmd.memcomp.src_addr.eid=1234;
cmd.memcomp.src_addr.uasid=1;
cmd.memcomp.src_addr.va=0x10000;
cmd.memcomp.dst_addr.eid=4321;
cmd.memcomp.dst_addr.uasid=2;
cmd.memcomp.dst_addr.va=0x20000;
cmd.memcomp.len=1024;
cmd.memcomp.inc_retval_offset=24;
```

e: Send/Recv Command

The send/recv command, namely, a send/receive command, is used to send/receive a two-sided message.

It should be noted that, for the send/recv command in embodiments of this application, the following points need to be noted:

(1) Before executing the orchestration command, the application program needs to use a URMA API to create Jetty (namely, a journal file system (JFS) and a journal file recorder (journal file recorder, JFR)) for sending and receiving.

① When the JFS and the JFR are integrated drive electronics (IDE) interfaces, due to concurrent access to the DDR, a common URMA operation and an orchestration task are not allowed to share the JFS and the JFR, and a plurality of orchestration tasks are not allowed to concurrently operate the same JFS and JFR.

② When the JFS and the JFR are DC interfaces, a common URMA operation and an orchestration task are allowed to share the JFS and the JFR, and a plurality of orchestration tasks are allowed to concurrently operate the same JFS and JFR.

③ In a scenario in which one JFR corresponds to a plurality of Berths for load balancing, because the Berths are implemented via the DDR, the common URMA operation and the orchestration task are not allowed to share each Berth, and different orchestration tasks are also not allowed to concurrently access each Berth. However, load balancing between the Berths is implemented by using hardware, so that different Berths may separately belong to common URMA operations or orchestration tasks, or separately belong to concurrent orchestration tasks.

④ Similar to URMA, orchestration does not support a tag matching capability.

(2) The send/recv command is an asynchronous orchestration command. For a format, refer to a URMA send/recv WQE format. Details are not described in this application.

(3) A destination address, a source address, and a length may be immediate values or variable parameters.

(4) A destination address in the recv command and a source address in the send command are local addresses. The local address may be a virtual address of a process, or may be an address in the orchestration scratchpad, and is indicated by 1 bit in flags.

(5) A return value of the send/recv command is a quantity of bytes that are successfully transmitted by the orchestration command. The value being greater than 0 indicates that transmission succeeds, and the value being equal to 0 indicates that execution fails (for example, because a queue is full, there is no matched send/recv request, or buffer area sizes requested in send/recv do not match).

(6) If the send/recv command has a critical error like access violation, the entire orchestration operator is abnormal instead of returning 0.

Example 1: 1024-byte data is sent from a location 0x10000 to Jetty whose UBVA is {EID=4321, UASID=2, JFR=0x20000} through a JFS 10.

```
orch_cmdcmd;
cmd.opcode=UB_SEND;
cmd.flags=0;
cmd.send.src_addr=0x10000;
cmd.send.jfs=10;
cmd.send.dst.eid=4321;
cmd.send.dst.uasid=2;
cmd.send.dst.jfr=0x20000;
cmd.send.len=1024;
```

Example 2: A maximum of 1024-byte data is received from a JFR 20 and stored in the memory address 0x10000, and the quantity of received bytes is stored at a location with an offset of 8 in the scratchpad.

```
orch_cmdcmd;
cmd.opcode=UB_RECV;
cmd.flags=0;
cmd.recv.addr=0x10000;
cmd.recv.jfr=20;
cmd.recv.len=1024;
cmd.recv.result_offset=8;
```

f: Atomic Compare and Write Command

The atomic compare and write command, namely, an atomic compare and swap command, is used to perform atomic swap with a comparison condition and a mask on fifth data of a preset quantity of bytes. The atomic compare and write command has synchronous and asynchronous modes that are specified by flags. This command atomically executes the following semantics: separately perform a logical AND operation on a mask and memory content at a destination address and a comparison address, and make a comparison. If memory content at the destination address is the same as memory content at the comparison address, the comparison succeeds, and all bits corresponding to bit 1 in the mask at the destination address are modified to corresponding bits at a swap address; or if the comparison fails, the destination address remains unchanged.

It should be noted that, for the atomic compare and write command in embodiments of this application, the following points need to be noted:

(1) Comparison conditions include complete equal, unconditional success (which is equivalent to atomic swap), and unconditional failure (only atomic comparison is performed without modification).

(2) For an orchestration command format, refer to a URMA atomic compare and write WQE format. Details are not described in this application.

(3) There are two modes: an immediate value mode and an address mode. In the immediate value mode, a comparison value, a mask value, and a swap value are all immediate values, and the immediate value mode is applicable to an atomic operation with no more than 8 bytes. In the address mode, a comparison address, a mask address, and a swap address are all addresses, and the address mode is applicable to an atomic operation of any length.

(4) In the immediate value mode, the destination address, the comparison value, the mask value, the swap value, and a length are all immediate values or variable parameters with 1 byte, 2 bytes, 4 bytes, or 8 bytes.

(5) In the address mode, the destination address, the comparison address, the mask address, the swap address, and a length are all immediate values or variable parameters.

(6) In the address mode, the comparison address, the mask address, and the swap address are all local addresses, and the addresses may all be virtual addresses of processes, or addresses in the orchestration scratchpad, and are indicated by 1 bit in flags.

(7) The destination address may be a local address or a remote address.

(8) Return value: If comparison and swap succeed, the return value is 1; or if comparison fails, the return value is 0.

(9) For the asynchronous atomic operation, an offset in the scratchpad may be specified, to perform increment on the received return value. When the asynchronous atomic operation is returned, a value of offset in the scratchpad is atomically added to the return value. This function is used to count a quantity of locks that are successfully obtained when a plurality of locks are concurrently obtained.

For example, an 8-byte CAS atomic operation is performed on an address whose UBVA is {EID=1234, UASID=1, VA=0x20000}, and a result is stored at a location whose address is 8 in the scratchpad.

```
orch_cmdcmd;
cmd.opcode=UB_ATOMIC_CAS;
cmd.flags=UB_ATOMIC_8B;
cmd.atomic_cas.dst_addr.eid=1234;
cmd.atomic_cas.dst_addr.uasid=1;
cmd.atomic_cas.dst_addr.va=0x20000;
cmd.atomic_cas.compare_addr=0x10000; // local addr
cmd.atomic_cas.swap_addr=0x20000; // local addr
cmd.atomic_cas.compare_mask_addr=0x30000; // local addr
cmd.atomic_cas.swap_mask_addr=0x40000; // local addr
cmd.atomic_cas.inc_retval_offset=8;
```

g: Atomic Compare and Add Command

The atomic compare and add command, namely, an atomic add command, is used to perform an atomic add operation with a comparison condition on sixth data of a preset quantity of bytes. The atomic compare and add command has synchronous and asynchronous modes that are specified by flags. This command atomically executes the following semantics: compare data at a destination address with a comparison value; and if a comparison condition is met, add an increment value to the destination address; or if a comparison condition is not met, skip modifying the destination address.

It should be noted that, for the atomic compare and add command in embodiments of this application, the following points need to be noted:

(1) The comparison condition may include any one of the following: equal to, not equal to, greater than, greater than or equal to, less than, less than or equal to, and unconditional success (which is equivalent to fetch and add).

(2) For an orchestration command format, refer to a URMA atomic compare and add WQE format. Details are not described in this application.

(3) The destination address, the compared data, and the added increment value may all be immediate values or variable parameters.

(4) The destination address may be a local address or a remote address.

(5) An operand of the atomic compare and add command may be 1 byte, 2 bytes, 4 bytes, or 8 bytes based on parameters in flags.

(6) Return value: If comparison and addition succeed, the return value is 1; or if comparison fails, the return value is 0.

(7) For the asynchronous atomic operation, an offset in the scratchpad may be specified, to perform increment on the received return value. When the asynchronous atomic operation is returned, a value of offset in the scratchpad is atomically added to the return value.

For example, an 8-byte CAA atomic operation is performed on an address whose UBVA is {EID=1234, UASID=1, VA=0x20000} (comparison is performed on the address, and if the address is less than or equal to 10, 1 is atomically added to the address), a fetch result is stored at a local memory address 0x10000, and an execution result of the command is stored at a location whose address is 8 in the scratchpad.

```
orch_cmdcmd;
cmd.opcode=UB_ATOMIC_CAA;
cmd.flags=UB_ATOMIC_8B;
cmd.atomic_caa.dst_addr.eid=1234;
cmd.atomic_caa.dst_addr.uasid=1;
cmd.atomic_caa.dst_addr.va=0x20000;
cmd.atomic_caa.fetch_addr=0x10000; // local addr
cmd.atomic_caa.compare_val=10;
cmd.atomic_caa.update_val=1;
cmd.atomic_caa.inc_retval_offset=8;
cmd.atomic_caa.opcode=ORCH_ARITH LE;
```

h: Exclusive Atomic Command

The exclusive atomic command is an exclusive atomic command. The exclusive atomic command is a variant of an atomic compare and swap (CAS) command and a compare and add (CAA) command, and is used to obtain, according to a cache coherence protocol, exclusive access permission of a physical memory address corresponding to a virtual address (lock address) of a process. The access permission can only be proactively released by an orchestration context and cannot be preempted. The permission control granularity is usually a cache line.

It should be noted that, for the exclusive atomic command in embodiments of this application, the following points need to be noted:

(1) A validity period of the obtained memory access permission is specified by a lock area, and the area is several consecutive orchestration commands in the orchestration operator. The lock area includes at least three orchestration commands. A first orchestration command shall be a synchronous CAS or CAA command used for locking, and is indicated by 2'b01 in flags. An intermediate orchestration command is indicated by 2'b10, and is an orchestration command to be executed in a critical section. A last orchestration command is indicated by 2'b11, and is usually used for unlocking. The exclusive access permission of the memory address is released herein.

(2) The first orchestration command is used to obtain the exclusive access permission of the lock address, and check the comparison condition in the atomic operation. If checking indicates a failure, a next command of the last command, indicated by 2'b11, in the lock area is jumped to. If checking indicates a success, swap (CAS) or add (CAA) in the atomic operation is performed, the orchestration commands indicated by 2'b10 and 2'b11 are executed, and finally the exclusive access permission is released.

(3) Nesting is not allowed in the lock area, and exclusive access permission of a plurality of addresses cannot be simultaneously obtained, to prevent deadlock.

(4) If an asynchronous operation is performed in the lock area, it is recommended that a wait command be used, to wait until the asynchronous operation is completed before releasing the exclusive access permission; otherwise, the asynchronous operation may not be completed when the exclusive access permission is released.

(5) Due to possibilities of a loop and conditional jump, a length of the lock area is not necessarily a quantity of actually executed orchestration commands. In the case of a jump from the lock area to a location outside the lock area (without executing the last orchestration command indicated by 2'b11), the exclusive access permission of the lock address is automatically released. If holding time of read/write access permission exceeds a hardware limit, the permission is automatically released, and it is considered as an orchestration anomaly.

(6) If hardware supports a distributed consistency capability, the lock address may be a local or remote address; otherwise, the lock address may only support a local address.

(7) The exclusive atomic command uses a cache coherence packet on a network, and does not introduce a new transaction-layer packet type.

For example, locking is performed, 1024-byte data is written, and unlocking is performed (it should be noted that the lock address is different from an address into which the data is written, and a lock is used to protect a data area).

```
orch_cmd cmd1, cmd2, cmd3;
cmd1.opcode=UB_ATOMIC_CAS;
cmd1.flags=UB_EXCLUSIVE_BEGIN|UB_ATOMIC_
    8B|UB_ATOMIC_IMM;
cmd1.atomic_cas.dst_addr.eid=1234;
cmd1.atomic_cas.dst_addr.uasid=1;
cmd1.atomic_cas.dst_addr.va=0x20000;
cmd1.atomic_cas.compare_val=0; // lock: from 0 to 1
cmd1.atomic_cas.swap_val=1;
orch_append_cmd (&orch_cmdlist, &cmd1);
cmd2.opcode=UB_MEMCOPY;
cmd2.flags=UB_EXCLUSIVE_MIDDLE;
cmd2.memcopy.src_addr.eid=1234;
cmd2.memcopy.src_addr.uasid=1;
cmd2.memcopy.src_addr.va=0x10000;
cmd2.memcopy.dst_addr.eid=4321;
cmd2.memcopy.dst_addr.uasid=2;
cmd2.memcopy.dst_addr.va=0x20000;
cmd2.memcopy.len=1024;
orch_append_cmd (&orch_cmdlist, &cmd2);
cmd3.opcode=UB_ATOMIC_CAS;
cmd3.flags=UB_EXCLUSIVE_END|UB_
    ATOMIC_8B|UB_ATOMIC_IMM;
cmd3.atomic_cas.dst_addr.eid=1234;
cmd3.atomic_cas.dst_addr.uasid=1;
cmd3.atomic_cas.dst_addr.va=0x20000;
cmd3.atomic_cas.compare_val=1; // from 1 to 0
cmd3.atomic_cas.swap_val=0;
orch_append_cmd (&orch_cmdlist, &cmd3);
```

It should be noted that the foregoing explanations and descriptions of the orchestration commands in Table 1 to Table 3 are merely a specific implementation of the definitions of the orchestration commands. In some other implementations of this application, there may be other definitions of different types of orchestration commands. This is not specifically limited in this application.

It should be noted that, in some embodiments of this application, before operation 101 is performed, the application program (for example, the first software) of the first computer device needs to register in advance with each memory region (namely, a location at which user data is stored) that is allowed to be accessed by the orchestration command. For a registration manner, refer to an existing related technology. Details are not described in this application.

It should be further noted that the application program of the first computer device may further register in advance with a storage area of an orchestration operator that needs to be locally called, specify a program including several orchestration commands, and set a memory region that is allowed to be accessed by the orchestration operator. In some embodiments of this application, in consideration of data security, a security token that needs to be carried by the caller may be further set, and a registration ID of the orchestration operator is obtained for a subsequent call. Because the first computer device may have a plurality of application programs, and each application program may have a unique namespace ID, an orchestration operator registered by each application program is valid only in namespace of the application program. For example, it is assumed that a unique namespace ID of an application program A of the first computer device is an ID 1. An orchestration operator registered by the application program A is valid only in namespace whose ID is the ID 1, to implement isolation between application programs.

In addition, regardless of whether there are one or more pieces of software executed on the first computer device, orchestration operators separately corresponding to the software may be obtained based on requests generated in real time. Orchestration operators separately corresponding to a plurality of different requests are independently executed and do not interfere with each other, to improve request execution performance.

102: The first network device performs a plurality of memory access operations based on the first orchestration operator, and obtains a response result of each memory access operation.

After obtaining the first orchestration operator, the first network device further performs the plurality of memory access operations based on the first orchestration operator. After each memory access operation is performed, the first network device obtains a response result (which may also be referred to as an execution result, a return result, or the like, and this is not limited in this application) corresponding to each memory access operation. For example, it is assumed that the first network device obtains k memory access operations based on the first orchestration operator. Then, k response results are correspondingly obtained, where one memory access operation corresponds to one response result, and k≥1.

It should be noted that, in embodiments of this application, because the memory access operation may be a local memory access operation or a remote memory access operation, a manner in which the first network device obtains the corresponding response result varies with a type of the memory access operation. The following separately describes the manners:

A. The Memory Access Operation is the Remote Memory Access Operation

In this case, the first network device first parses the orchestration command in the first orchestration operator, to obtain Q local memory access operations, where Q≥1. For example, the first network device may parse a variable parameter (for example, a return value of a previous orchestration command and an intermediate variable in the first orchestration context) of the orchestration command in the first orchestration operator, to obtain P remote memory access operations, where P≥1. The variable parameter is a parameter whose specific value can be determined only when the orchestration command is executed. For details, refer to the foregoing descriptions about the variable parameter. Details are not described herein again.

Then, the first network device generates a network packet that respectively corresponds to each remote memory access operation. One remote memory access operation may access a memory segment. If a length of a memory exceeds a maximum size of a single network packet, the network packet is split into a plurality of network packets. In other words, one remote memory access operation may correspond to one or more network packets. This is not specifically limited in this application.

After generating the network packet that respectively corresponds to each remote memory access operation, the first network device may send each network packet to a respectively corresponding remote network device (which may be referred to as a second network device). There may be one or more remote network devices, which is determined based on a specific situation during application. This is not limited in this application.

After receiving the respective network packet, each second network device accesses, based on information carried in the respective network packet, a memory (namely, a remote memory of the first network device) that respectively corresponds to the second network device, and generates a corresponding response result after completing access. One remote memory access operation corresponds to one response result. Finally, each response result is returned to the first network device.

B. The Memory Access Operation is the Local Memory Access Operation

In this case, similarly, the first network device first parses the orchestration command in the first orchestration operator, to obtain Q local memory access operations, where Q≥1. For example, the first network device may parse a variable parameter (for example, a return value of a previous orchestration command and an intermediate variable in the first orchestration context) of the orchestration command in the first orchestration operator, to obtain Q local memory access operations, where Q≥1. The variable parameter is a parameter whose specific value can be determined only when the orchestration command is executed. For details, refer to the foregoing descriptions about the variable parameter. Details are not described herein again.

Then, the first network device directly accesses a local memory based on each local memory access operation, to obtain a response result of each local memory access operation.

103: The first network device generates a first completion instruction after obtaining the response result of each memory access operation, where the first completion instruction indicates that execution of the first orchestration operator is completed.

The first network device triggers generation of a completion instruction (which may also be referred to as a completion event) after obtaining the response result that respectively corresponds to each memory access operation. A completion instruction corresponding to the first orchestration operator is a first completion instruction, and the first completion instruction indicates that execution of the first orchestration operator is completed.

It should be noted that in some embodiments of this application, the first network device may send the first completion instruction to the control unit of the first computer device, so that the control unit of the first computer device knows that execution of the first orchestration operator is completed. For example, in some embodiments of this application, the first completion instruction may be sent by the first network device to a send queue, an interrupt is generated based on a mechanism that is the same as a mechanism of a common completion queue, and a corresponding initiation process (namely, the first application) on the first computer device is woken up. In addition, the first computer device may periodically access the first network device, to learn in time whether the first network device generates the first completion instruction, and determine, according to the first completion instruction, whether execution of the first orchestration operator is completed. A specific implementation of how the first computer device learns that execution of the first orchestration operator is completed is not limited in this application.

Figure 4:
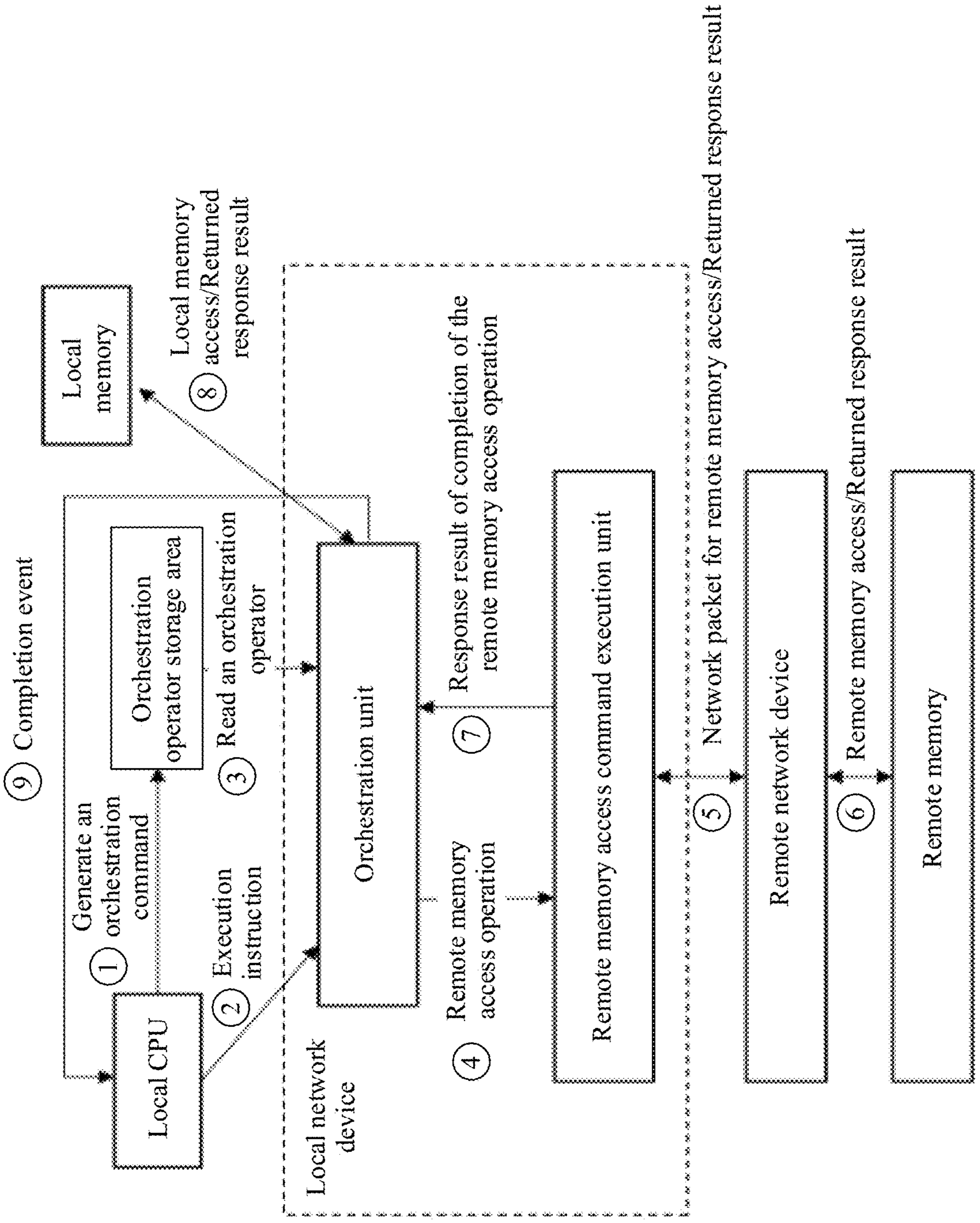
FIG. 4 is a diagram of a local orchestration system architecture according to an embodiment of this application.

It should be noted that the execution operations in an embodiment corresponding to FIG. 1 are described by using the network device as an execution body. In an actual application process, an orchestration unit (which may also be referred to as an orchestration engine) may be added to the network device to implement an execution operation of an orchestration operator. Specifically, the orchestration unit may read the orchestration operators from the storage area of the orchestration operators, to execute the orchestration commands one by one. In an execution process of local orchestration, the orchestration unit may call a transaction layer to access a remote memory, call a DMA engine to access a local memory, or asynchronously execute another group of orchestration commands. In an execution process of remote orchestration, the orchestration unit of the remote network device may be called to execute another orchestration operator, asynchronously execute another group of orchestration operators, or the like. Specifically, FIG. 4 is a diagram of a local orchestration system architecture according to an embodiment of this application. Modules included in the system architecture may include a local CPU, a local memory (which may also be referred to as an initiator memory), a local network device (which may also be referred to as an initiator network device or the first network device), a remote network device (namely, the second network device), and a remote memory (this application is not related to a remote CPU). The local network device includes an orchestration unit and a remote memory access operation execution unit (namely, a transaction layer). The orchestration unit is a newly added module.

Based on the system architecture corresponding to FIG. 4, the following uses target software executed on the local CPU as an example to describe functions of the modules and an interaction process between the modules. It should be noted that any application program executed on the local computer device may be used as the target software, and is not limited to an application program executed on the local CPU. This is merely an example. The functions of the modules and the interaction between the modules are as follows:

Operation 1: The target software (namely, the first application) executed on the local CPU fills, into an orchestration operator storage area (namely, the first storage area), a code program including a group of orchestration commands, where the group of orchestration commands may include one or more orchestration commands, and the group of orchestration commands forms the orchestration operator (namely, the first orchestration operator). It should be noted herein that, in some application scenarios (for example, the orchestration operator is a simple orchestration operator), alternatively, the local CPU may directly send the orchestration operator to the orchestration unit of the local network device.

Operation 2: The target software executed on the local CPU sends an execution instruction (namely, the first execution instruction) corresponding to the orchestration operator to the orchestration unit of the local network device, to instruct the orchestration unit to read the corresponding orchestration operator. It should be noted herein that if the local CPU directly sends the orchestration operator to the orchestration unit of the local network device, operation 2 does not need to be performed.

Operation 3: The orchestration unit triggers generation of an orchestration context (namely, the first orchestration context) according to the execution instruction, and then reads the orchestration operator from the orchestration operator storage area. Content of the orchestration context includes a caller of the orchestration operator, a pointer of a currently executed orchestration command, a counter of an asynchronously executed orchestration command, a location of a last orchestration command in the orchestration operator, a loop counter, a loop jump location, an intermediate variable in a process of executing the orchestration task, and the like. Then, if the operation is a remote memory access operation, operation 4 to operation 7 and operation 9 are performed. If the operation is a local memory access operation, operation 8 and operation 9 are performed. It should be noted herein that if the local CPU directly sends the orchestration operator to the orchestration unit of the local network device, operation 2 does not need to be performed. Therefore, the orchestration unit triggers generation of the orchestration context based on the orchestration operator received from the local CPU.

Operation 4: If it is determined, based on the orchestration operator, that the operation is a remote memory access operation, the orchestration unit further parses a variable parameter in the orchestration command, to obtain the remote memory access operation, and sends the remote memory access operation to a remote memory access operation execution unit of the local network device.

Operation 5: The remote memory access operation execution unit of the local network device generates, based on each remote memory access operation, a network packet that respectively corresponds to each remote memory access operation, sends the generated network packet to a respectively corresponding remote network device (only one remote network device is used as an example herein), and receives a returned response result (namely, an access result of the remote memory).

Operation 6: The remote network device executes an operation of accessing the remote memory based on the received network packet, and returns the response result to the remote memory access operation execution unit of the local network device.

Operation 7: The remote memory access operation execution unit of the local network device sends a response result received each time to the orchestration unit of the local network device, and the orchestration unit searches for a corresponding orchestration context based on the response result, and stores the response result at a location (for example, an intermediate variable in the orchestration context) specified by the orchestration command.

Operation 8: If it is determined, based on the orchestration operator, that the operation is a local memory access operation, similarly, the orchestration unit further parses a variable parameter in the orchestration command, to obtain the local memory access operation, accesses the local memory based on each local memory access operation, and stores an access result (namely, the response result) of the local memory at a location specified by the orchestration command.

Operation 9: When execution of the orchestration operator is completed (that is, the orchestration unit receives a response result corresponding to each memory access operation), the orchestration unit destroys an orchestration context corresponding to the orchestration operator, and generates a completion instruction (namely, the first completion instruction), where the completion instruction may also be referred to as a completion event used to notify an initiation process of the orchestration operator.

Figure 5:
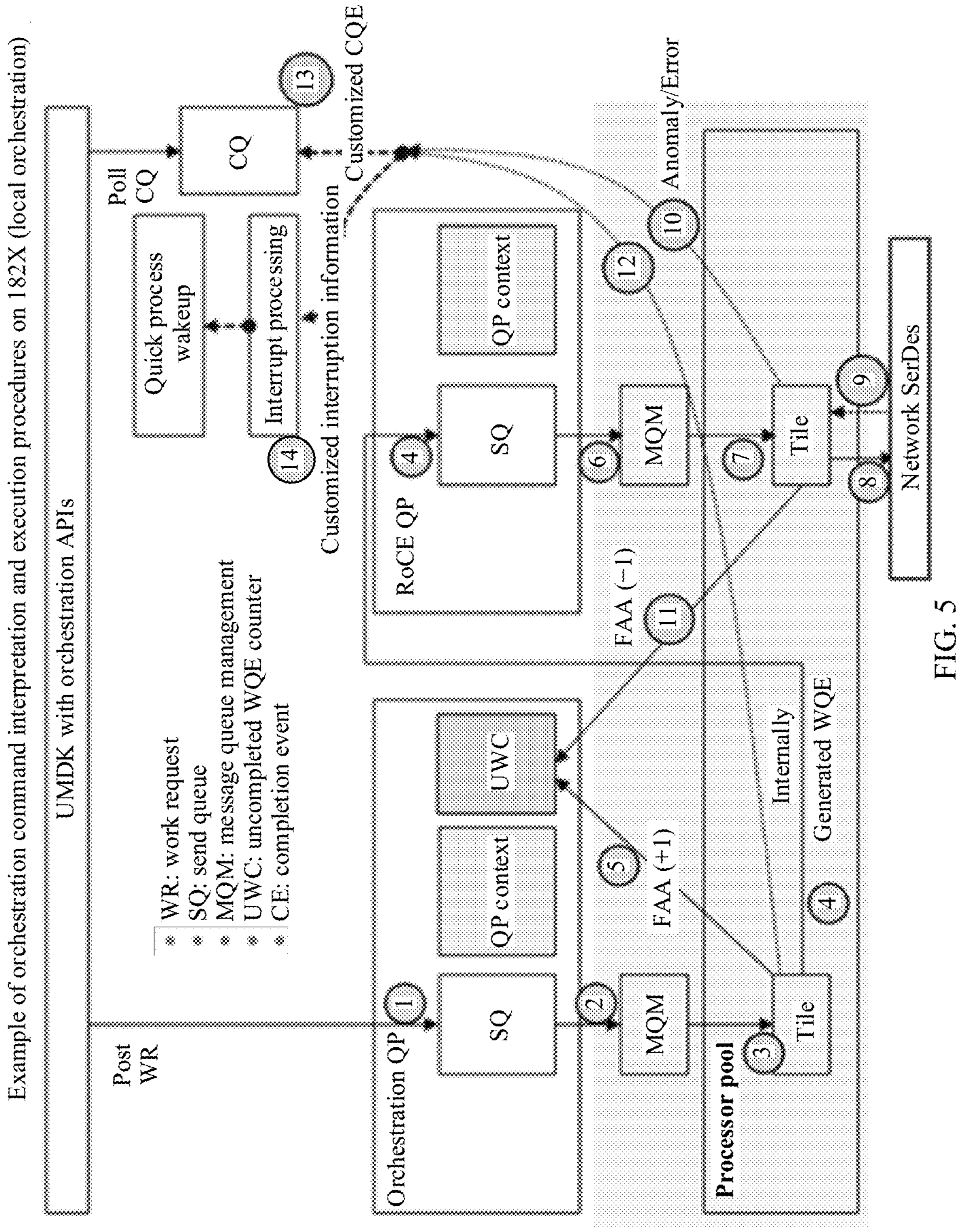
FIG. 5 is a diagram of an execution procedure of local orchestration on 182X according to an embodiment of this application.

To facilitate understanding of specific implementation of the system architecture in the local orchestration process, the following uses FIG. 5 as an example to show a reference implementation of the orchestration unit. Specifically, FIG. 5 is a diagram of an execution procedure of local orchestration on 182X according to an embodiment of this application. Interpretation and execution of all orchestration commands are completed on a 182X processor. An orchestration operator corresponds to a special orchestration QP. The orchestration QP is used as an interpreter to interpret an orchestration command. The orchestration QP internally executes a control command and a local memory access command, and calculates a variable command parameter. An intermediate status is stored in a QPC. The orchestration QP generates a WQE of an asynchronous remote memory access command, switches the context to a context (QPC) of an RoCE QP at which the memory access command is located, sends a remote access packet based on a processing process of the ROCE QP, and switches back to the context (QPC) of the orchestration QP. The orchestration QP continuously executes a plurality of WQEs in a WQE list until a wait command, a synchronous remote memory access command, or an orchestration end command is encountered. After receiving a response packet from a network, the ROCE QP finds the orchestration QP based on the WQE, updates a status of the corresponding orchestration QP, and wakes up a waiting orchestration QP as required.

Based on the foregoing descriptions, a most innovative part of the network device-based data processing method described in embodiments of this application is executing, at the local end, an orchestration operator including a parameterized local or remote memory access command, control command, and computation command. This can reduce a quantity of interactions between a CPU and a network device, offload a data structure processing request to a node at which data is located for execution (for example, directly offloading to the network device for execution), to improve performance of a distributed communication request. In addition, the orchestration operator provided in embodiments of this application is a simple and unified programming abstraction, and can be efficiently executed on a plurality of network devices, to resolve difficulty in microcode programming and incompatibility between microcode of network devices of different architectures.

2. Remote Orchestration

Figure 6:
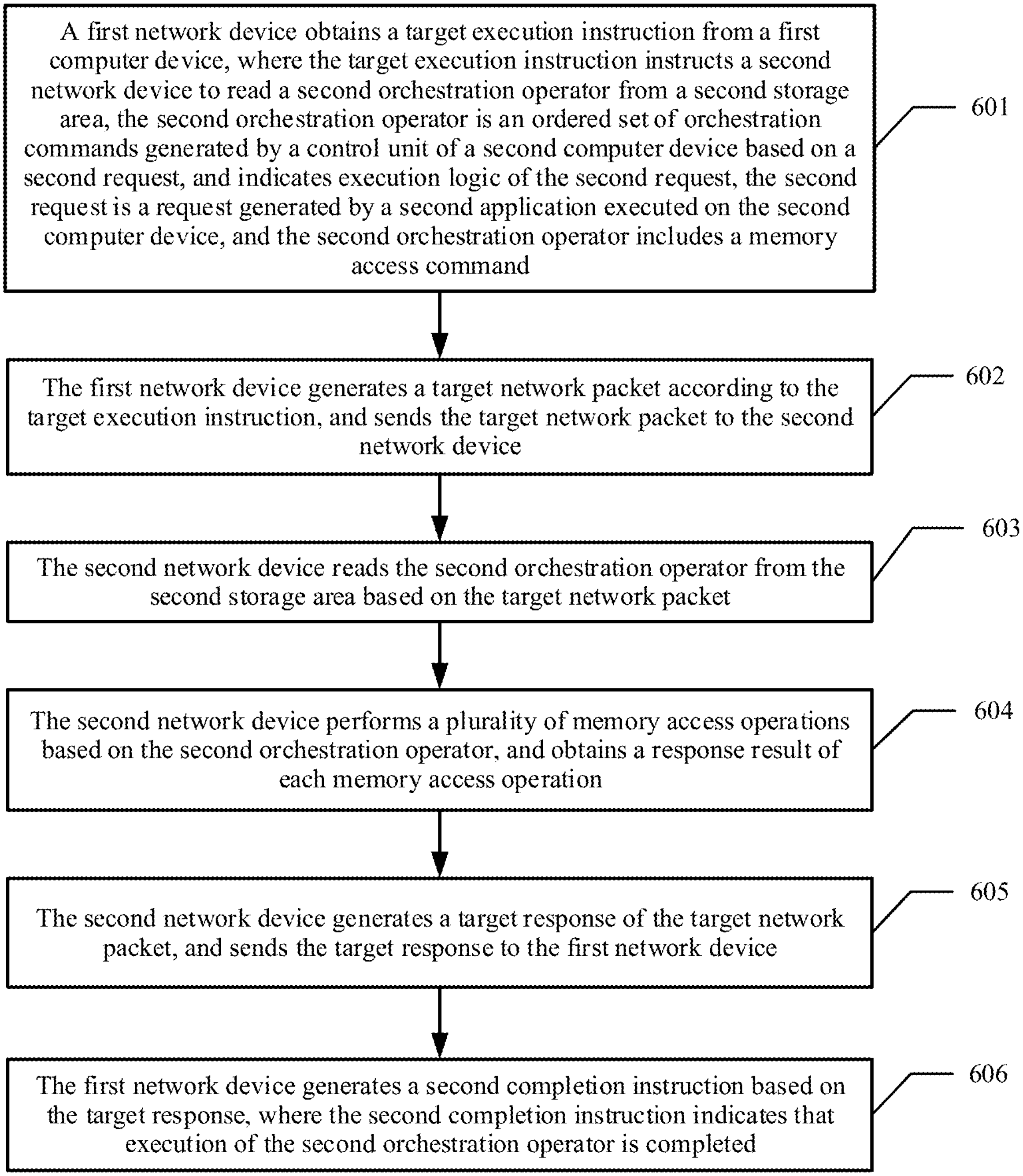
FIG. 6 is a schematic flowchart of a network device-based data processing method according to an embodiment of this application.

The remote orchestration is a process of executing an orchestration operator on a network device (for example, the following second network device) on a different host from an initiator (for example, the following first computer device). Specifically, FIG. 6 is a schematic flowchart of a network device-based data processing method according to an embodiment of this application. The method may include the following operations:

601: A first network device obtains a target execution instruction from a first computer device, where the target execution instruction instructs a second network device to read a second orchestration operator from a second storage area, the second orchestration operator is an ordered set of orchestration commands generated by a control unit of a second computer device based on a second request, and indicates execution logic of the second request, the second request is a request generated by a second application executed on the second computer device, and the second orchestration operator includes a memory access command.

A process of target software (which may be referred to as second software or the second application) executed on the second computer device (namely, a remote end) generates a request (which may be referred to as the second request) in real time. The control unit of the second computer device generates, based on the currently generated second request, an orchestration operator (which may be referred to as the second orchestration operator) corresponding to the second request. Similarly, the second orchestration operator is a group of ordered code including the orchestration commands, which forms an ordered set of the orchestration commands indicating the execution logic of the corresponding second request. After constructing the corresponding second orchestration operator based on the second request, the control unit of the second computer device may store the second orchestration operator in a preset storage area (for example, a DDR memory). The storage area is used as a storage area of the orchestration operator of the second computer device, and may be referred to as the second storage area. All orchestration operators generated by the control unit of the second computer device may be stored in the second storage area.

It should be noted that the application program of the second computer device may register in advance with a storage area of an orchestration operator that needs to be remotely called, specify a program including several orchestration commands, and set a memory region that is allowed to be accessed by the orchestration operator. In some embodiments of this application, in consideration of data security, a security token that needs to be carried by a caller may be further set, and a registration ID of the orchestration operator is obtained for a subsequent call. Because the second computer device may have a plurality of application programs, and each application program may have a unique namespace ID, an orchestration operator registered by each application program is valid only in namespace of the application program. For example, it is assumed that a unique namespace ID of an application program B of the second computer device is an ID 2. An orchestration operator registered by the application program B is valid only in namespace whose ID is the ID 2, to implement isolation between application programs. In addition, regardless of whether there are one or more pieces of software executed on the second computer device, orchestration operators separately corresponding to the software may be obtained based on requests generated in real time. Orchestration operators separately corresponding to a plurality of different requests are independently executed and do not interfere with each other, to improve request execution performance.

It should be further noted that, in a remote orchestration process, the control unit of the second computer device may also generate, based on an orchestration software architecture, an orchestration operator corresponding to the request. For details, refer to descriptions in an embodiment corresponding to FIG. 2 or FIG. 3. Details are not described herein again.

In addition, in the remote orchestration process, an execution body of calling of the orchestration operator is still the first network device. Therefore, after storing the second orchestration operator in the second storage area, the second network device may send a notification instruction to a CPU of the first network device, to notify that the corresponding orchestration operator is registered. When the first network device needs to remotely call the second orchestration operator, a CPU of the first computer device generates a target execution instruction, and sends the target execution instruction to the first network device, where the target execution instruction instructs the second network device to read the second orchestration operator from the second storage area.

It should be noted that, in embodiments of this application, because the orchestration operator is used to perform memory access, the orchestration commands forming the second orchestration operator need to include the memory access command, and the memory access command indicates a type of a memory access operation. In addition, it should be further noted that, in some embodiments of this application, to more flexibly express internal execution logic of a request generated by an application, and enable the orchestration operator to express both a static workflow diagram and a dynamic workflow diagram, in addition to including the memory access command, the orchestration operator may further include at least one type of the following orchestration commands: a control command and a computation command. The control command is used to control the second network device, and the computation command is used to perform an arithmetic and/or logical operation on at least one operand.

It should be noted that, in some embodiments of this application, the memory access command, the computation command, and the control command may have different representation forms based on specific functions. For descriptions about definitions of different orchestration commands, refer to descriptions about the definitions of the orchestration commands in an embodiment corresponding to FIG. 1. Details are not described in this application again.

602: The first network device generates a target network packet according to the target execution instruction, and sends the target network packet to the second network device.

After receiving the target execution instruction sent by the first computer device, the first network device generates, according to the target execution instruction, a corresponding network packet that may be referred to as the target network packet. Then, the first network device further sends the target network packet to the second network device.

603: The second network device reads the second orchestration operator from the second storage area based on the target network packet.

After receiving the target network packet that corresponds to the target execution instruction and that is sent by the first network device, the second network device reads the second orchestration operator from the second storage area based on information carried in the target network packet.

It should be noted that, in some embodiments of this application, the second network device further generates an orchestration context (which may be referred to as a second orchestration context) corresponding to the second orchestration operator. The second orchestration context is used to store an intermediate status of an orchestration task (namely, a memory access operation) during execution.

It should be further noted that, in some embodiments of this application, content of the orchestration context may include at least one of the following: a caller of the orchestration operator, a pointer of a currently executed orchestration command, a counter of an asynchronously executed orchestration command, a location of a last orchestration command in the orchestration operator, a loop counter, a loop jump location, an intermediate variable in a process of executing the orchestration task, and the like. For example, the second orchestration context may include at least one of the following: a caller (namely, the second computer device) of the second orchestration operator, a pointer of a currently executed orchestration command, a counter of an asynchronously executed orchestration command, a location of a last orchestration command in the orchestration operator, a loop counter, a loop jump location, an intermediate variable in a process of executing the orchestration task, and the like.

It should be noted that, in some embodiments of this application, a manner in which the second network device generates the second orchestration context may be as follows: after receiving the target network packet that corresponds to the target execution instruction and that is sent by the first network device, the second network device triggers generation of the second orchestration context. For example, a specific generation manner may be as follows: when starting to execute the second orchestration operator, the second network device allocates an idle orchestration context from an orchestration context pool, and initializes a scratchpad in the orchestration context by using a parameter specified by the second software. Then, the second orchestration operator is used to store an intermediate status during execution of the orchestration operator.

604: The second network device performs a plurality of memory access operations based on the second orchestration operator, and obtains a response result of each memory access operation.

After obtaining the second orchestration operator, the second network device further obtains the plurality of memory access operations based on the second orchestration operator. After each memory access operation is performed, the second network device obtains the response result (which may also be referred to as an execution result, a return result, or the like, and this is not limited in this application) corresponding to each memory access operation. For example, it is assumed that the second network device obtains k' memory access operations based on the second orchestration operator. Then, k' response results are correspondingly obtained, where one memory access operation corresponds to one response result, and $k' \geq 1$.

It should be noted that, in embodiments of this application, because the memory access operation may be a local memory access operation or a remote memory access operation, a manner in which the second network device obtains the corresponding response result varies with a type of the memory access operation. The following separately describes the manners:

A. The Memory Access Operation is the Remote Memory Access Operation

In this case, the second network device first parses the orchestration command in the second orchestration operator, to obtain P' remote memory access operations, where $P' \geq 1$. For example, the second network device may parse a variable parameter (for example, a return value of a previous orchestration command and an intermediate variable in the second orchestration context) of the orchestration command in the second orchestration operator, to obtain the P' remote memory access operations, where $P' \geq 1$. The variable parameter is a parameter whose specific value can be determined only when the orchestration command is executed. For details, refer to the foregoing descriptions about the variable parameter. Details are not described herein again.

Then, the second network device generates a network packet that respectively corresponds to each remote memory access operation. One remote memory access operation may access a memory segment. If a length of a memory exceeds a maximum size of a single network packet, the network packet is split into a plurality of network packets. In other words, one remote memory access operation may correspond to one or more network packets. This is not specifically limited in this application.

After generating the network packet that respectively corresponds to each remote memory access operation, the second network device may send each network packet to a respectively corresponding remote network device (which may be referred to as a third network device). There may be one or more remote network devices, which is determined based on a specific situation during application. This is not limited in this application. It should be noted that the third network device may be the first network device (which is an initiator of remote calling), or another network device different from the first network device. This is not specifically limited in this application.

After receiving the respective network packet, each third network device accesses, based on information carried in the respective network packet, a memory (namely, a remote memory of the second network device) that respectively corresponds to the third network device, and generates a corresponding response result after completing access. One remote memory access operation corresponds to one response result. Finally, each response result is returned to the second network device.

B. The Memory Access Operation is the Local Memory Access Operation

In this case, similarly, the second network device parses the orchestration command in the first orchestration operator, to obtain Q local memory access operations, where $Q \geq 1$. For example, the second network device may parse a variable parameter (for example, a return value of a previous orchestration command and an intermediate variable in the first orchestration context) of the orchestration command in the first orchestration operator, to obtain the Q local memory access operations, where $Q \geq 1$. The variable parameter is a parameter whose specific value can be determined only when the orchestration command is executed. For details, refer to the foregoing descriptions about the variable parameter. Details are not described herein again.

Then, the second network device directly accesses a local memory based on each local memory access operation, to obtain a response result of each local memory access operation.

605: The second network device generates a target response of the target network packet, and sends the target response to the first network device.

The second network device generates the target response of the target network packet after receiving the response result that respectively corresponds to each memory access operation, and sends the target response to the first network device.

606: The first network device generates a second completion instruction based on the target response, where the second completion instruction indicates that execution of the second orchestration operator is completed.

The first network device triggers generation of a completion instruction (which may also be referred to as a completion event) after receiving the target response sent by the second network device. A completion instruction corresponding to the second orchestration operator is the second completion instruction, and the second completion instruction indicates that execution of the second orchestration operator is completed. Similarly, in some embodiments of this application, the first network device may send the second completion instruction to the control unit of the first computer device, so that the control unit of the first computer device knows that execution of the second orchestration operator is completed. For example, in some embodiments of this application, the second completion instruction may be sent by the first network device to a send queue, and an interrupt is generated based on a mechanism that is the same as a mechanism of a common completion queue. Details are not described in this application. In addition, the first computer device may periodically access the first network device, to learn in time whether the first network device generates the second completion instruction, and determine, according to the second completion instruction, whether execution of the second orchestration operator is completed. A specific implementation of how the first computer device learns that execution of the second orchestration operator is completed is not limited in this application.

Figure 7:
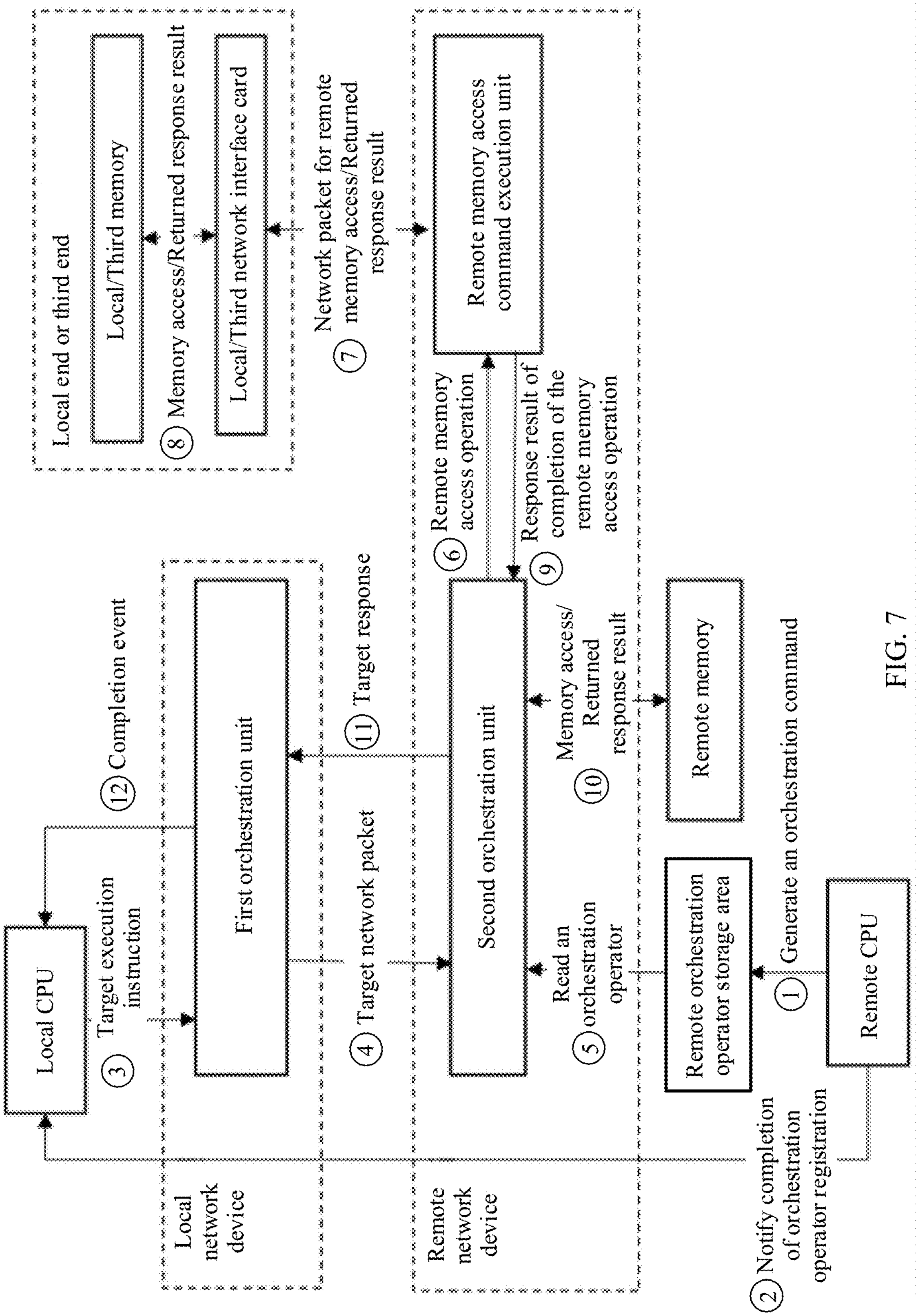
FIG. 7 is a diagram of a remote orchestration system architecture according to an embodiment of this application.

It should also be noted that the execution operations in an embodiment corresponding to FIG. 6 are described by using the network device as an execution body. In an actual application process, an orchestration unit (which may also be referred to as an orchestration engine) may alternatively be added to the network device to implement an execution operation of an orchestration operator. Specifically, the orchestration unit may read the orchestration operators from the storage area of the orchestration operators, to execute the orchestration commands one by one. In an execution process of local orchestration, the orchestration unit may call a transaction layer to access a remote memory, call a DMA engine to access a local memory, or asynchronously execute another group of orchestration commands. In an execution process of remote orchestration, the orchestration unit of the remote network device may be called to execute another orchestration operator, asynchronously execute another group of orchestration operators, or the like. Specifically, FIG. 7 is a diagram of a remote orchestration system architecture according to an embodiment of this application. Modules included in the system architecture may include a local CPU, a local network device (which may also be referred to as an initiator network device or the first network device), a remote CPU, a remote network device (namely, the second network device), a remote memory, a third network device, and a third memory (if the third network device is not the first network device, this application is not related to a third CPU). The local network device includes a first orchestration unit and a first remote memory access operation execution unit (namely, a first transaction layer). The remote network device includes a second orchestration unit and a second remote memory access operation execution unit (namely, a second transaction layer). Each orchestration unit is a newly added module of each network device.

Based on the system architecture corresponding to FIG. 7, the following uses target software executed on the remote CPU (namely, a CPU of the second computer device) as an example to describe functions of the modules and an interaction process between the modules. It should be noted that any application program executed on the second computer device may be used as the target software, and is not limited to an application program executed on the CPU of the second computer device. This is merely an example. The functions of the modules and the interaction between the modules are as follows:

Operation 1: The target software (namely, the second application) executed on the remote CPU (namely, the CPU of the second computer device) fills, into a remote orchestration operator storage area (namely, the second storage area), a code program including a group of orchestration commands, where the group of orchestration commands may include one or more orchestration commands, and the group of orchestration commands forms the orchestration operator (namely, the second orchestration operator).

Operation 2: The target software executed on the remote CPU notifies the local CPU (namely, the CPU of the first computer device) that the orchestration operator is registered.

Operation 3: The local CPU sends an execution instruction (namely, the target execution instruction) corresponding to the second orchestration operator to the orchestration unit (namely, the first orchestration unit) of the local network device (namely, the first network device).

Operation 4: The first orchestration unit receives the target execution instruction sent by the local CPU, generates a network packet (namely, the target network packet) that is called by remote orchestration and that corresponds to the target execution instruction, and sends the target network packet to the orchestration unit (namely, the second orchestration unit) of the remote network device (namely, the second network device). The target execution instruction instructs the second network device to read the second orchestration operator from the remote orchestration operator storage area.

Operation 5: After receiving the target network packet, the second orchestration unit parses information carried in the target network packet, and triggers generation of an orchestration context (namely, the second orchestration context), and then reads the second orchestration operator from the remote orchestration operator storage area based on the carried information. Content of the orchestration context includes a caller of the orchestration operator, a pointer of a currently executed orchestration command, a counter of an asynchronously executed orchestration command, a location of a last orchestration command in the orchestration operator, a loop counter, a loop jump location, an intermediate variable in a process of executing the orchestration task, and the like. Then, if the operation is a remote memory access operation, operation 6 to operation 9, operation 11, and operation 12 are performed. If the operation is a local memory access operation, operation 10 to operation 12 are performed.

Operation 6: If it is determined, based on the orchestration operator, that the operation is a remote memory access operation, the second orchestration unit further parses a variable parameter in the orchestration command, to obtain the remote memory access operation, and sends the remote memory access operation to a memory access operation execution unit of the third network device, where the third network device may be a local network device or a third-party network device.

Operation 7: The remote memory access operation execution unit of the second network device generates, based on each remote memory access operation, a network packet that respectively corresponds to each remote memory access operation, sends the generated network packet to a third network device that respectively corresponds to each network packet, and receives a returned response result (namely, an access result of the local memory or a third-party remote memory).

Operation 8: The third network device executes an operation of accessing a third remote memory based on the received network packet, and returns the response result to the remote memory access operation execution unit of the second network device. It should be noted that, if the third network device is the first network device, the third remote memory is a local memory of the first computer device. If the third network device is a third-party network device different from the first network device, the third remote memory is a third-party memory of a third computer device.

Operation 9: The remote memory access operation execution unit of the second network device sends a response result received each time to the second orchestration unit, and the second orchestration unit searches for a corresponding orchestration context based on the response result, and stores the response result at a location (for example, an intermediate variable in the orchestration context) specified by the orchestration command.

Operation 10: If it is determined, based on the orchestration operator, that the operation is a local memory access operation, similarly, the second orchestration unit further parses a variable parameter in the orchestration command, to obtain the local memory access operation, accesses the local memory based on each local memory access operation, and stores an access result (namely, the response result) of the local memory at a location specified by the orchestration command.

Operation 11: When execution of the second orchestration operator is completed (that is, the second orchestration unit receives a response result corresponding to each memory access operation), the second orchestration unit destroys the second orchestration context corresponding to the second orchestration operator, generates a target response corresponding to the target network packet, and sends the target response to the first orchestration unit.

Operation 12: After receiving the target response, the first orchestration unit generates a completion instruction (namely, the second completion instruction), where the completion instruction may also be referred to as a completion event used to notify the local CPU.

Figure 8:
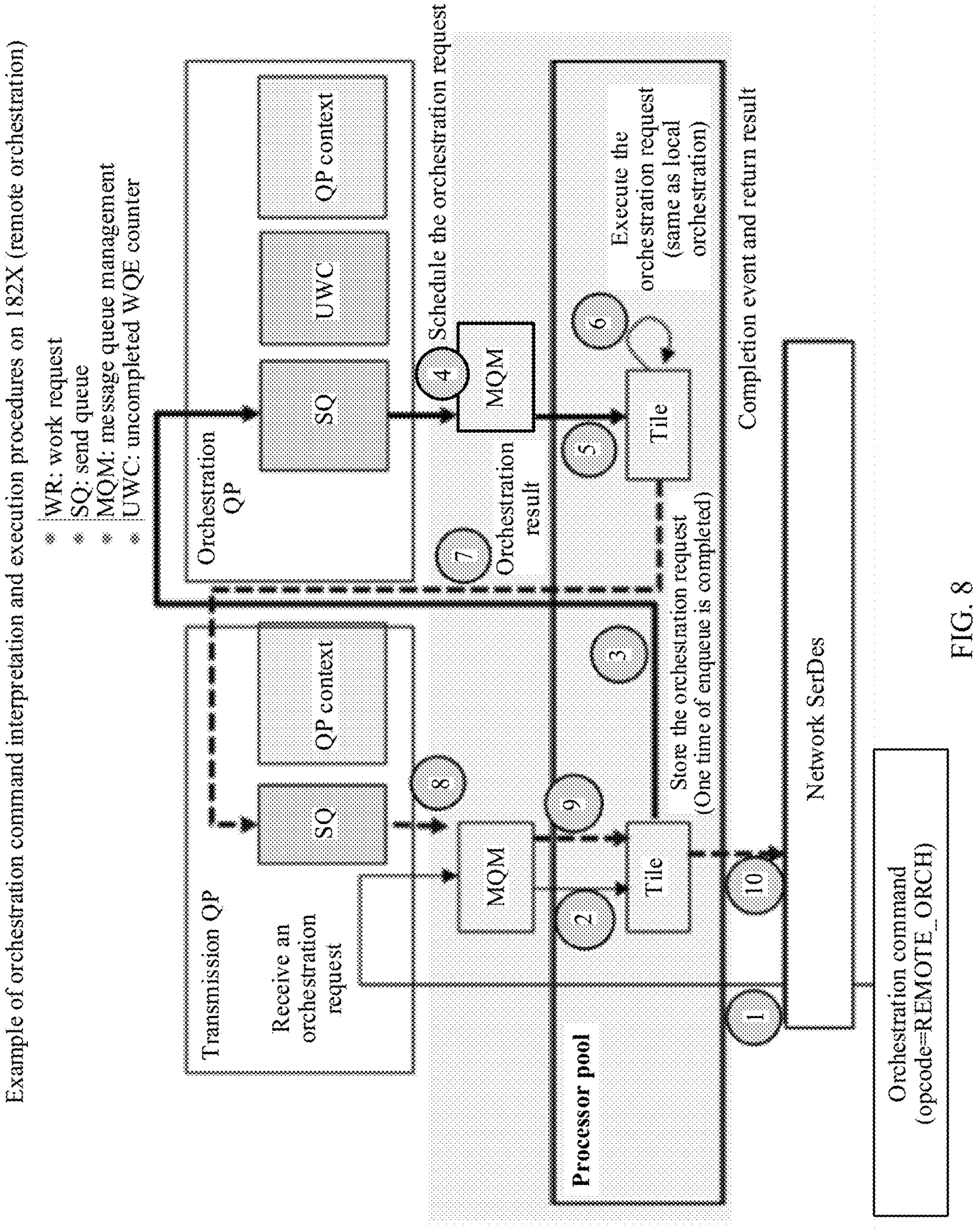
FIG. 8 is a diagram of an execution procedure of remote orchestration on 182X according to an embodiment of this application.

To facilitate understanding of specific implementation of the system architecture in the local orchestration process, the following uses FIG. 8 as an example to show a reference implementation of the orchestration unit. Specifically, FIG. 8 is a diagram of an execution procedure of remote orchestration on 182X according to an embodiment of this application. A message carrying a remote orchestration request and result uses a new transaction-layer packet: REMOTE_ORCH and REMOTE_ORCH_RES. A remote orchestration command is sent to a corresponding remote orchestration QP via a transmission QP. At an initiator of the remote orchestration command, a network interface card reads and parses an orchestration operator. If the orchestration command is write, a source address of the orchestration command is an immediate value, and a length is less than a specific threshold, data is directly carried in a WQE (for example, a key in KV searching); otherwise, a local address is allowed to be accessed by a remote end (if a local address is not allowed to be accessed by a remote end, software of the initiator copies the local address). Security of remote orchestration is ensured by QP establishment and remote command verification. A remote orchestration QP records the orchestration command in an SQ, and schedules and executes the orchestration command. When the orchestration command is executed, if the orchestration command is a write operation, and the data is carried in the WQE, the data is directly stored in a DDR through DMA. If the orchestration command is another write operation, the write operation is converted into a read operation, and the data is sent to an RoCE QP. If the orchestration command is a read operation, the read operation is converted into a write operation, and the data is sent to the ROCE QP.

Based on the foregoing descriptions, in the network device-based data processing method described in embodiments of this application, an orchestration operator including a parameterized local or remote memory access command, control command, and computation command is executed at the remote end. This can reduce a quantity of interactions between a CPU and a network device, offload a data structure processing request to a node at which data is located for execution (for example, directly offloading to the network device for execution), to improve performance of a distributed communication request. In addition, the orchestration operator provided in embodiments of this application is a simple and unified programming abstraction, and can be efficiently executed on a plurality of network devices, to resolve difficulty in microcode programming and incompatibility between microcode of network devices of different architectures.

Figure 9:
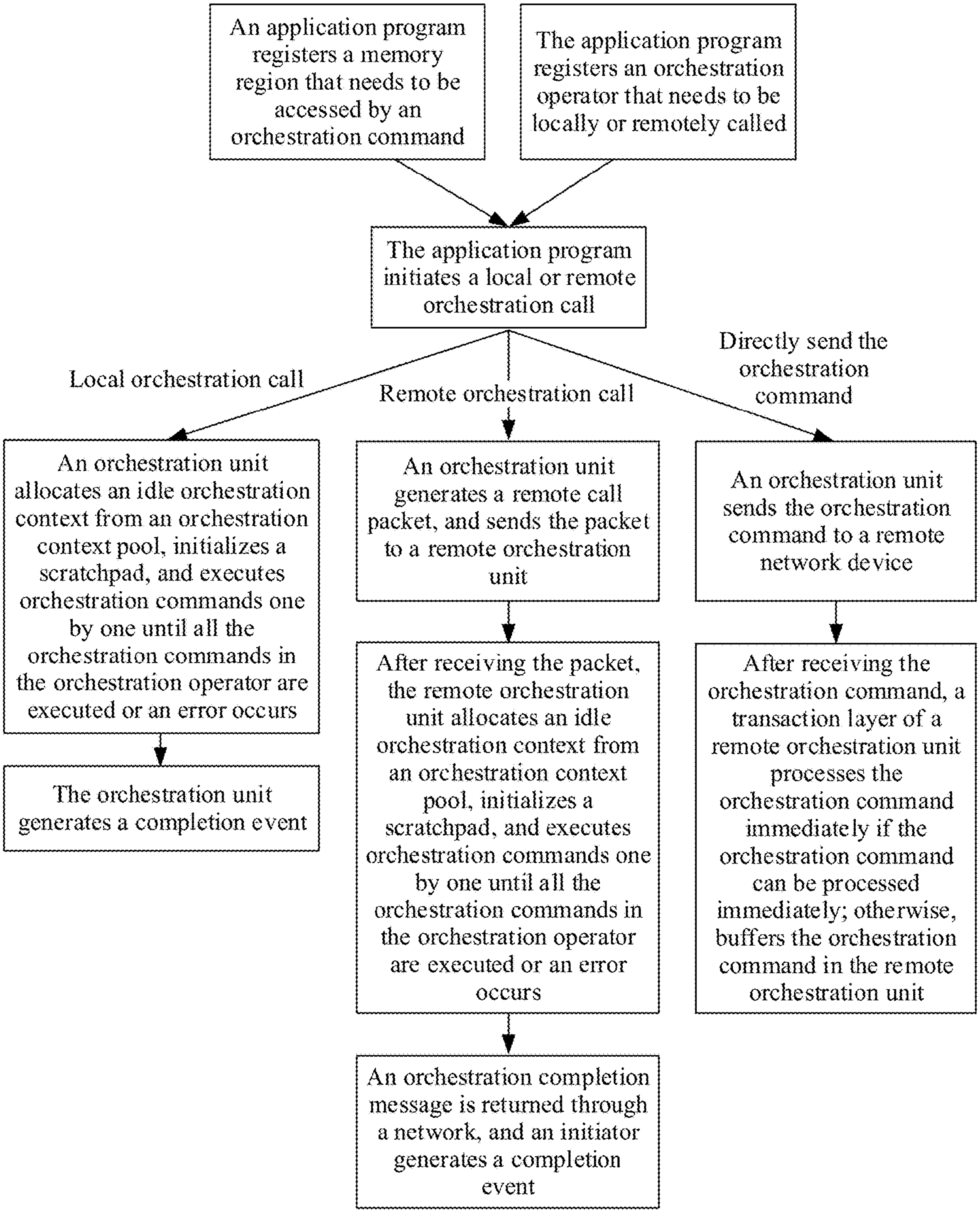
FIG. 9 is a schematic flowchart of a network device-based data processing method according to an embodiment of this application.

In conclusion, the orchestration operator may be used for local orchestration or remote orchestration. In other words, an application program (for example, an application program of a CPU) of a computer device may initiate a local orchestration call or a remote orchestration call (for example, transferring a network routing address of an orchestration unit, a namespace ID of an orchestration operator, a registration ID of the orchestration operator, a security token, and a parameter of the orchestration operator to a local orchestration unit). In embodiments of this application, if the network routing address of the orchestration unit is a local address, it is a local call; otherwise, it is a remote call. For example, for a specific execution procedure, refer to FIG. 9. FIG. 9 is a schematic flowchart of a network device-based data processing method according to an embodiment of this application. An application program (for example, the first software) of a computer device needs to register in advance with each memory region (namely, a location at which user data is stored) that is allowed to be accessed by an orchestration command. For a registration manner, refer to an existing related technology. Details are not described in this application. In addition, the application program of the computer device further needs to register in advance with a storage area of an orchestration operator that needs to be locally called, specify a program including several orchestration commands, and set a memory region that is allowed to be accessed by the orchestration operator. In some embodiments of this application, in consideration of data security, a security token that needs to be carried by a caller may be further set, and a registration ID of the orchestration operator is obtained for a subsequent call. Because the computer device may have a plurality of application programs, and each application program may have a unique namespace ID, an orchestration operator registered by each application program is valid only in namespace of the application program, to implement isolation between application programs.

After registration is completed, a local orchestration call procedure is as follows: when a local orchestration unit starts to execute the orchestration operator, the local orchestration unit allocates an idle context from an orchestration context pool, initializes a scratchpad in the context by using a parameter specified by the application program, and executes orchestration commands one by one until an orchestration end command is encountered, all commands are executed, or an anomaly occurs. A remote orchestration call procedure is as follows: a caller orchestration unit (which may also be referred to as an initiator orchestration unit, where the initiator orchestration unit is a local orchestration unit by default in this application) generates a packet including information such as a call request sequence number, an address of the orchestration unit, a namespace ID of an orchestration operator, a registration ID of the orchestration operator, a security token, and a parameter of the orchestration operator, and sends the packet to a called orchestration unit through a network. After receiving the packet, the called orchestration unit allocates an idle orchestration context from an orchestration context pool, initializes a scratchpad, and executes orchestration commands one by one until all orchestration commands in the orchestration operator are executed or an error occurs. After execution of the orchestration operator is completed, a completion packet is returned to the caller.

It should be noted that, in some embodiments of this application, alternatively, the application program of the CPU may directly send, to a work queue of the network device, the orchestration operator including the orchestration commands. After receiving the orchestration operator, a transaction layer of a remote network device processes the orchestration operator immediately if the orchestration operator can be processed immediately. If the transaction layer depends on an execution result of a previous orchestration command, the transaction layer stores the orchestration command in a buffer area of the network device or a memory, and sequentially processes the orchestration operator after execution of the previous orchestration command is completed.

Specifically, when executing each orchestration command in the orchestration operator, the orchestration unit parses a variable parameter in the orchestration command, and replaces the variable parameter with an actual value in an orchestration context status register, a scratchpad, or a memory. When executing a memory access command in the orchestration operator, the orchestration unit may verify access permission of a memory address. If the memory address is a remote address, the orchestration command is sent to the transaction layer of the network device for execution. If the memory address is a local address, the orchestration unit calls a local DMA engine for execution. When executing a local or remote orchestration call command in the orchestration operator, the orchestration unit may verify an access token of a queue address of the orchestration command, and then execute a procedure that is the same as that of a local or remote orchestration call initiated by the CPU. When the orchestration unit encounters an orchestration command that needs to be waited for execution, the orchestration unit suspends a current orchestration command queue, and switches the context to another orchestration command queue. When starting to execute an asynchronous command (including memory access and an orchestration call), the orchestration unit progressively increases an in-transit command counter. When execution of the asynchronous command ends, the orchestration unit progressively decreases the in-transit command counter. If a condition specified by a wait command is met, the orchestration unit wakes up a suspended orchestration task.

The following describes several typical application scenarios of the network device-based data processing method described in embodiments of this application.

A. Programmable Working Procedure

Figure 10:
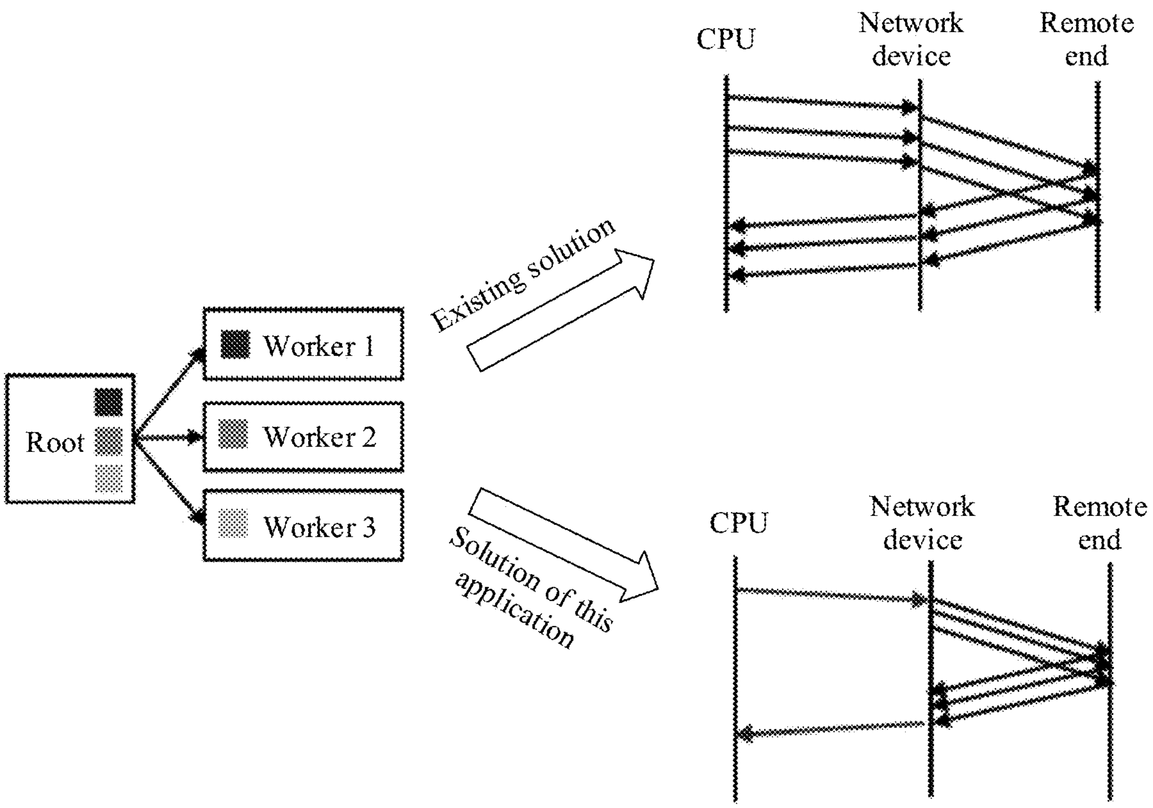
FIG. 10 is a diagram of comparison between a solution of this application and a solution of the conventional technology.

In this application scenario, according to the network device-based data processing method in embodiments of this application, repeated work/data flows/task dependency graphs and the like of the CPU may be offloaded to the network device for execution, to implement batch processing. Specifically, FIG. 10 is a diagram of comparison between a solution of this application and a solution of the conventional technology. In the solution of the conventional technology, a CPU sends each operation to a network device, and receives a returned completion event. However, in the method of this application, a CPU needs to interact with a network device only for one time. For example, if there are three workers, each worker needs to perform sending and receiving interaction for one time. However, according to the method in embodiments of this application, three workers may be combined to perform sending and receiving interaction only for one time, to reduce a quantity of CQEs, prevent the CPU from being repeatedly interrupted, and reduce I/O overheads of the CPU. In addition, this can further reduce a quantity of WQEs repeatedly sent by the CPU, and reduce I/O overheads and a communication request latency.

For example, the CPU may deliver a batch of operations to the network device for processing in batches. For example, the local device needs to send one piece of data to 1000 remote devices. In the solution of the conventional technology, the CPU needs to interact with the network device for 1000 times, and the CPU is repeatedly interrupted by completion events. However, according to the method in embodiments of this application, the CPU needs to send only an orchestration operator of "batch sending" to the network device, and the network device generates a plurality of independent memory access operations. After all the memory access operations are completed, the network device notifies the CPU of a completion event, to greatly reduce a quantity of interaction times between the CPU and the network device, and prevent the CPU from being repeatedly interrupted by completion events. The CPU can execute another computing task during communication, to implement parallel computing and communication.

B. Remote Memory Request

In this application scenario (for example, traversing a linked list in a remote memory, counting a quantity of nodes in a linked list, or remote atomic memory access), according to the network device-based data processing method in embodiments of this application, a request that requires a plurality of times of memory access may be offloaded to a network device on a remote node. This can achieve beneficial effect such as reducing a delay and bandwidth overheads of repeated network transmission, improving a distributed request throughput, and reducing a fault domain.

Figure 11:
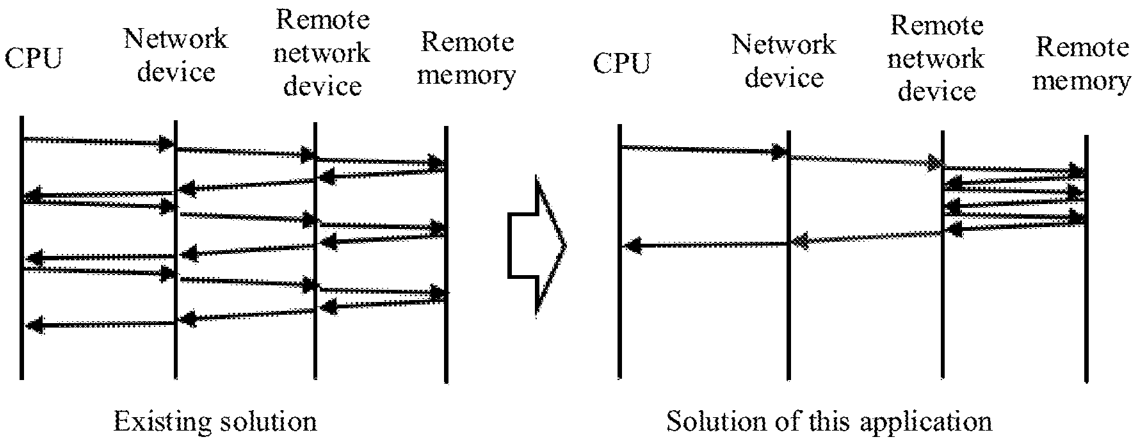
FIG. 11 is another diagram of comparison between a solution of this application and a solution of the conventional technology.

Specifically, FIG. 11 is another diagram of comparison between a solution of this application and a solution of the conventional technology. In the solution of the conventional technology, a one-sided operation is used to access a data structure in a remote memory. However, the solution has the following disadvantages: (1) A plurality of network round-trips are required. For example, when an atomic operation is performed on an object, the object first needs to be locked, written with data, and then unlocked. The one-sided operations cannot be performed in parallel because the operations are logically dependent. Each one-sided operation requires one network round-trip, and total request processing time includes a plurality of network round trip times (RTTs). (2) When an object is locked by a remote node, another request cannot access the object. When a large quantity of requests from different clients concurrently access a same object, accessing can only be performed in a serial manner. Each access needs to wait for two RTTs, which affects a request throughput. (3) When a client is faulty, a lock may be lost. In other words, when the client is faulty after obtaining the lock, the client cannot unlock the object, and the object remains in a locked state. However, the method in embodiments of this application may implement a function of switching from a one-sided operation to a two-sided operation. Specifically, for a group of logically dependent operations, for example, an object is first locked, if locking succeeds, the object is read, written, and unlocked; or an index is queried, and then data is queried. Due to association of the logic or the data, if one-sided operations are performed, a plurality of network round-trips are required. In the method in embodiments of this application, the operations are packaged into a remote network device for execution, to decrease a plurality of network round-trips to one time, and reduce an end-to-end delay of a request.

In addition, the method in embodiments of this application may further implement programmability of a request. Specifically, one orchestration operator may enable a plurality of nodes to collaboratively complete a complex task. For example, a client sends log data to a primary node. Log space is locally allocated to an orchestration task (programmable macro instruction) of a network device on the primary node and the orchestration task is written into a log, and then the log is forwarded to two secondary nodes. Log space is also allocated to an orchestration task (programmable macro instruction) of a network device on the secondary node and the orchestration task is written into a log. Such a complex task usually needs to be implemented by a CPU through RPC. However, in the method in embodiments of this application, overheads of the CPU can be reduced through orchestration offloading, and a latency of waking up the CPU is eliminated.

It should be noted that the foregoing is merely descriptions of several typical application scenarios of the method in embodiments of this application. During actual application, the method in embodiments of this application may be applied to another application scenario. Specific examples are not enumerated herein.

Figure 12:
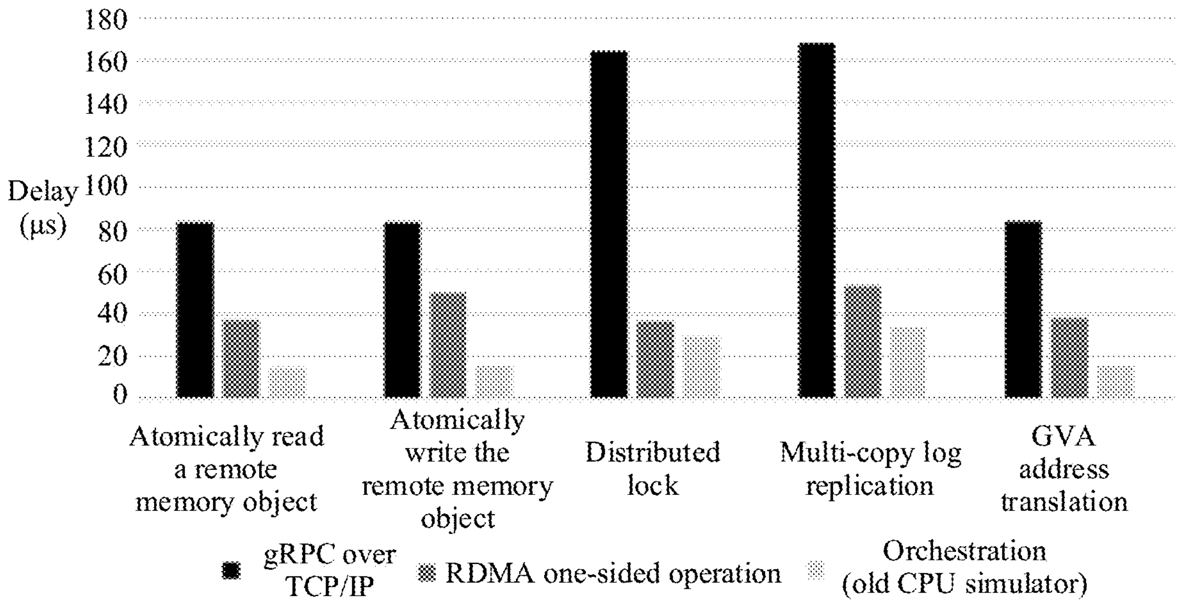
FIG. 12 is a diagram of comparison between a test result of a method according to an embodiment of this application and a test result of an existing solution.

To have more intuitive understanding of beneficial effect brought by embodiments of this application, the following further compares technical effect brought by embodiments of this application and technical effect brought by an existing solution. Specifically, FIG. 12 is a diagram of comparison between a test result of a method according to an embodiment of this application and a test result of an existing solution. The following conclusion may be drawn based on FIG. 12.

Test results of the conventional technology are as follows: a solution 1 calls a remote CPU for processing through remote RPC, and has a significantly high latency due to overheads of processing a TCP/IP protocol stack by the CPU. A solution 2 uses RDMA one-sided operations for processing, has a low latency of a single network round-trip, but has a high overall latency due to a plurality of network round-trips caused by the one-sided operations. Results of Embodiments of the present invention: A plurality of network round-trips may be decreased to one time by packaging the operations to a remote end for execution, and a remote CPU does not need to participate in the entire processing process, to reducing an end-to-end delay of a request.

For a CPU-based orchestration simulator, a 1822 network interface card performs reading for 30 μs (2 RRTs) with a random read performance parameter of single-core 303K IOPS, and performs writing for 19 μs (1 RRT) with a random write performance parameter of 434K IOPS.

An MLX CX-5 network interface card performs reading for 8.9 μs (2 RRTs) with a random read performance parameter of 607K IOPS, and performs writing for 6.7 μs (1 RRT) with a random write performance parameter of 794K IOPS.

In comparison with a write operation, that is, a conventional RDMA one-sided operation, a latency of the 1822 network interface card is decreased by 62%.

Figure 13:
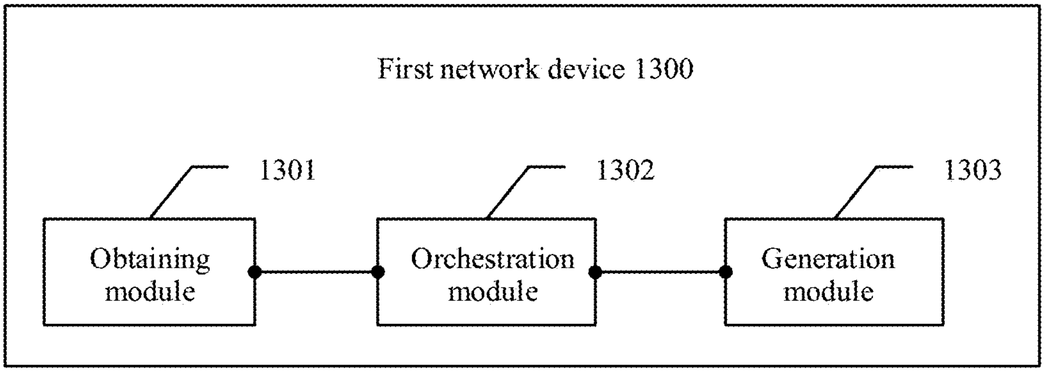
FIG. 13 is a diagram of a structure of a first network device according to an embodiment of this application.

Based on the corresponding embodiments, the following further provides a related device used to implement the solutions, to better implement the solutions in embodiments of this application. Specifically, FIG. 13 is a diagram of a structure of a first network device according to an embodiment of this application. A first network device 1300 includes: an obtaining module 1301, an orchestration module 1302, and a generation module 1303. The obtaining module 1301 is configured to obtain a first orchestration operator. The first orchestration operator is an ordered set of orchestration commands generated by a control unit of a first computer device based on a first request, and indicates execution logic of the first request, the first request is a request generated by a first application executed on the first computer device, the first orchestration operator includes a memory access command, and the memory access command indicates a type of a memory access operation. The orchestration module 1302 is configured to perform a plurality of memory access operations based on the first orchestration operator, and obtain a response result of each memory access operation. The generation module 1303 is configured to generate a first completion instruction after the orchestration module 1302 obtains the response result of each memory access operation. The first completion instruction indicates that execution of the first orchestration operator is completed.

In an embodiment, the obtaining module 1301 is further configured to: before the orchestration module 1302 performs the plurality of memory access operations based on the first orchestration operator, generate a first orchestration context corresponding to the first orchestration operator, where the first orchestration context is used to store an execution status of the memory access operation.

In an embodiment, the first orchestration context includes at least one of the following: a caller of the first orchestration operator, a pointer of a currently executed orchestration command, a counter of an asynchronously executed orchestration command, a location of a last orchestration command in the first orchestration operator, a loop counter, a loop jump location, and an intermediate variable in a process of performing the memory access operation.

In an embodiment, the memory access operation is a remote memory access operation, and the orchestration module 1302 is configured to: parse the orchestration command in the first orchestration operator, to obtain a plurality of remote memory access operations; send a network packet corresponding to at least one remote memory access operation to at least one second network device, so that the second network device accesses, based on the network packet, a memory (namely, a remote memory of the first network device) corresponding to the second network device, and the second network device generates a response result after completing access, where one remote memory access operation corresponds to one response result; and receive the response result sent by the second network device.

In an embodiment, the memory access operation is a local memory access operation, and the orchestration module 1302 is configured to: parse the orchestration command in the first orchestration operator, to obtain a plurality of local memory access operations; and access a local memory based on the first orchestration operator, to obtain a response result of each local memory access operation.

In an embodiment, the obtaining module 1301 is configured to obtain a first execution instruction from the first computer device, where the first execution instruction instructs the first network device to read the first orchestration operator from a first storage area.

In an embodiment, the obtaining module 1301 is configured to receive the first orchestration operator directly sent by the first computer device.

In an embodiment, the first orchestration operator includes at least one type of the following orchestration commands: a control command and a computation command. The control command is used to control the first network device, and the computation command is used to perform an arithmetic and/or logical operation on at least one operand.

In an embodiment, a type of the control command includes at least one of the following: a conditional jump command, a loop command, a wait command, a local orchestration operator call command, a remote orchestration operator call command, and an orchestration end command. The conditional jump command is used to jump to at least one first target orchestration command based on at least one variable parameter. The loop command is used to cyclically execute at least one second target orchestration command for m times, where m≥1. The wait command is used to wait until execution of at least one third target orchestration command is completed, where the variable parameter is a parameter whose specific value is determined only when the orchestration command is executed. The local orchestration operator call command is used to asynchronously call a local orchestration operator. The remote orchestration operator call command is used to asynchronously call a remote orchestration operator. The orchestration end command is used to end execution of an orchestration context.

In an embodiment, a type of the computation command includes at least one of the following: a binary arithmetic and/or logical computation command and a bit width conversion computation command. The binary arithmetic and/or logical computation command is used to obtain a first computation result based on two operands, and the bit width conversion computation command is used to convert a bit width of an operand, to obtain a second computation result.

In an embodiment, a type of the memory access command includes at least one of the following: a load command, used to fetch first data of a preset quantity of bytes from a local memory address, or fetch second data of a preset quantity of bytes from a remote memory address; a store command, used to write third data of a preset quantity of bytes into the local memory address, or write fourth data of a preset quantity of bytes into the remote memory address; a memory copy command, used to copy local or remote data; a compare command, used to compare local or remote data; a send/receive command, used to send/receive a two-sided message; an atomic compare and swap command, used to perform atomic swap with a comparison condition and a mask on fifth data of a preset quantity of bytes; an atomic add command, used to perform an atomic add operation with a comparison condition on sixth data of a preset quantity of bytes; and an exclusive atomic command, used to obtain exclusive access permission for a local or remote memory address according to a cache coherence protocol.

It should be noted that content such as information exchange and an execution process between the modules/units in the first network device 1300 provided in FIG. 13 is based on a same concept as the method embodiment corresponding to FIG. 1 in this application. For specific content, refer to the descriptions in the method embodiment in this application. Details are not described herein again.

Figure 14:
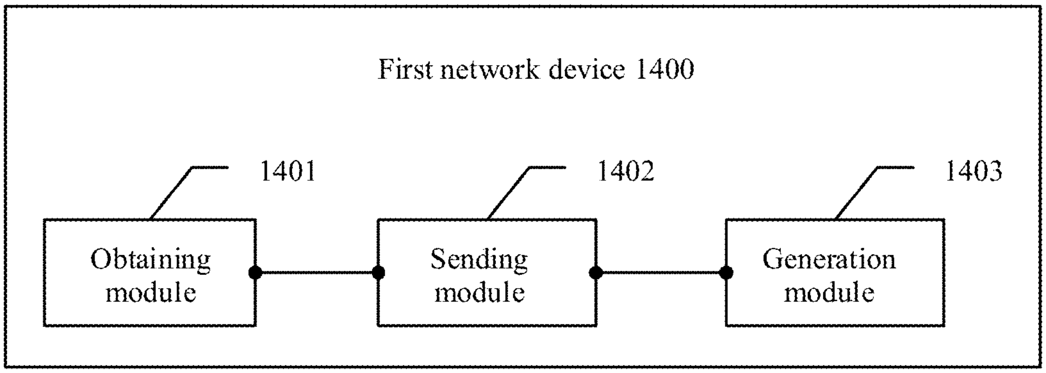
FIG. 14 is a diagram of another structure of a first network device according to an embodiment of this application.

An embodiment of this application further provides a network device, and the network device serves as a first network device. Specifically, FIG. 14 is a diagram of another structure of a first network device according to an embodiment of this application. A first network device 1400 includes: an obtaining module 1401, a sending module 1402, and a generation module 1403. The obtaining module 1401 is configured to obtain a target execution instruction from a first computer device. The target execution instruction instructs a second network device to read a second orchestration operator from a second storage area, the second orchestration operator is an ordered set of orchestration commands generated by a control unit of the second computer device based on a second request, and indicates execution logic of the second request, the second request is a request generated by a second application executed on the second computer device, the second orchestration operator includes a memory access command, and the memory access command indicates a type of a memory access operation. The sending module 1402 is configured to generate a target network packet according to the target execution instruction, and send the target network packet to the second network device, so that the second network device reads the second orchestration operator from the second storage area based on the target network packet, the second network device performs a plurality of memory access operations based on the second orchestration operator, and the second network device obtains a response result of each memory access operation and generates a target response of the target network packet. The generation module 1403 is configured to generate a second completion instruction after receiving the target response sent by the second network device. The second completion instruction indicates that execution of the second orchestration operator is completed.

In an embodiment, the first orchestration operator includes at least one type of the following orchestration commands: a control command and a computation command. The control command is used to control the second network device, and the computation command is used to perform an arithmetic and/or logical operation on at least one operand.

In an embodiment, a type of the control command includes at least one of the following: a conditional jump command, a loop command, a wait command, a local orchestration operator call command, a remote orchestration operator call command, and an orchestration end command. The conditional jump command is used to jump to at least one first target orchestration command based on at least one variable parameter, where the variable parameter is a parameter whose specific value is determined only when the orchestration command is executed. The loop command is used to cyclically execute at least one second target orchestration command for m times, where m≥1. The wait command is used to wait until execution of at least one third target orchestration command is completed. The local orchestration operator call command is used to asynchronously call a local orchestration operator. The remote orchestration operator call command is used to asynchronously call a remote orchestration operator. The orchestration end command is used to end execution of an orchestration context.

In an embodiment, a type of the computation command includes at least one of the following: a binary arithmetic and/or logical computation command and a bit width conversion computation command. The binary arithmetic and/or logical computation command is used to obtain a first computation result based on two operands, and the bit width conversion computation command is used to convert a bit width of an operand, to obtain a second computation result.

In an embodiment, a type of the memory access command includes at least one of the following: a load command, used to fetch first data of a preset quantity of bytes from a local memory address, or fetch second data of a preset quantity of bytes from a remote memory address; a store command, used to write third data of a preset quantity of bytes into the local memory address, or write fourth data of a preset quantity of bytes into the remote memory address; a memory copy command, used to copy local or remote data; a compare command, used to compare local or remote data; a send/receive command, used to send/receive a two-sided message; an atomic compare and swap command, used to perform atomic swap with a comparison condition and a mask on fifth data of a preset quantity of bytes; an atomic add command, used to perform an atomic add operation with a comparison condition on sixth data of a preset quantity of bytes; and an exclusive atomic command, used to obtain exclusive access permission for a local or remote memory address according to a cache coherence protocol.

It should be noted that content such as information exchange and an execution process between the modules/units in the first network device 1400 provided in FIG. 14 is based on a same concept as an execution process of the first network device in the method embodiment corresponding to FIG. 6 in this application. For specific content, refer to the descriptions in the method embodiment in this application. Details are not described herein again.

Figure 15:
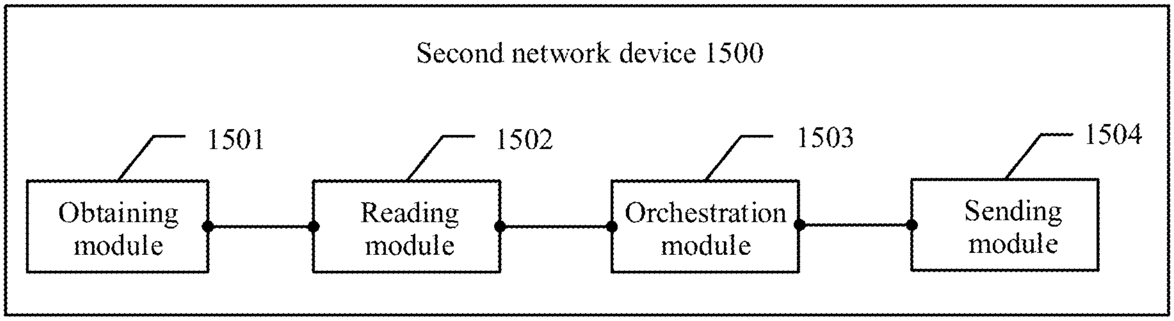
FIG. 15 is a diagram of a structure of a second network device according to an embodiment of this application.

An embodiment of this application further provides a network device, and the network device serves as a second network device. Specifically, FIG. 15 is a diagram of a structure of a second network device according to an embodiment of this application. A second network device 1500 includes: an obtaining module 1501, a reading module 1502, an orchestration module 1503, and a sending module 1504. The obtaining module 1501 is configured to receive a target network packet sent by a first network device. The target network packet is generated by the first network device according to a target execution instruction, the target execution instruction instructs the second network device to read a second orchestration operator from a second storage area, the second orchestration operator is an ordered set of orchestration commands generated by a control unit of the second computer device based on a second request, and indicates execution logic of the second request, the second request is a request generated by a second application executed on the second computer device, the second orchestration operator includes a memory access command, and the memory access command indicates a type of a memory access operation. The reading module 1502 is configured to read the second orchestration operator from the second storage area based on the target network packet. The orchestration module 1503 is configured to perform a plurality of memory access operations based on the second orchestration operator, and obtain a response result of each memory access operation. The sending module 1504 is configured to generate a target response of the target network packet after the orchestration module 1503 obtains the response result of each memory access operation, and send the target response to the first network device, so that the first network device generates a second completion instruction based on the target response. The second completion instruction indicates that execution of the second orchestration operator is completed.

In an embodiment, the obtaining module 1501 is configured to: before the second network device performs the plurality of memory access operations based on the second orchestration operator, generate a second orchestration context corresponding to the second orchestration operator, where the second orchestration context is used to store an execution status of the memory access operation.

In an embodiment, the second orchestration context includes at least one of the following: a caller of the second orchestration operator, a pointer of a currently executed orchestration command, a counter of an asynchronously executed orchestration command, a location of a last orchestration command in the second orchestration operator, a loop counter, a loop jump location, and an intermediate variable in a process of performing the memory access operation.

In an embodiment, the memory access operation is a remote memory access operation, and the orchestration module 1503 is configured to: parse the orchestration command in the second orchestration operator, to obtain a plurality of remote memory access operations; send a network packet corresponding to at least one remote memory access operation to at least one third network device, so that the third network device accesses, based on the network packet, a memory (namely, a remote memory of the second network device) that respectively corresponds to the third network device, and the third network device generates a response result after completing access, where one remote memory access operation corresponds to one response result; and receive the response result sent by the third network device.

In an embodiment, the third network device includes: the first network device or a network device different from the first network device.

In an embodiment, the memory access operation is a local memory access operation, and the orchestration module 1503 is configured to: parse the orchestration command in the second orchestration operator, to obtain a plurality of local memory access operations; and access a local memory based on the second orchestration operator, to obtain a response result of each local memory access operation.

In an embodiment, the first orchestration operator includes at least one type of the following orchestration commands: a control command and a computation command. The control command is used to control the second network device, and the computation command is used to perform an arithmetic and/or logical operation on at least one operand.

In an embodiment, a type of the control command includes at least one of the following: a conditional jump command, a loop command, a wait command, a local orchestration operator call command, a remote orchestration operator call command, and an orchestration end command. The conditional jump command is used to jump to at least one first target orchestration command based on at least one variable parameter, where the variable parameter is a parameter whose specific value is determined only when the orchestration command is executed. The loop command is used to cyclically execute at least one second target orchestration command for m times, where m≥1. The wait command is used to wait until execution of at least one third target orchestration command is completed. The local orchestration operator call command is used to asynchronously call a local orchestration operator. The remote orchestration operator call command is used to asynchronously call a remote orchestration operator. The orchestration end command is used to end execution of an orchestration context.

In an embodiment, a type of the computation command includes at least one of the following: a binary arithmetic and/or logical computation command and a bit width conversion computation command. The binary arithmetic and/or logical computation command is used to obtain a first computation result based on two operands, and the bit width conversion computation command is used to convert a bit width of an operand, to obtain a second computation result.

In an embodiment, a type of the memory access command includes at least one of the following: a load command, used to fetch first data of a preset quantity of bytes from a local memory address, or fetch second data of a preset quantity of bytes from a remote memory address; a store command, used to write third data of a preset quantity of bytes into the local memory address, or write fourth data of a preset quantity of bytes into the remote memory address; a memory copy command, used to copy local or remote data; a compare command, used to compare local or remote data; a send/receive command, used to send/receive a two-sided message; an atomic compare and swap command, used to perform atomic swap with a comparison condition and a mask on fifth data of a preset quantity of bytes; an atomic add command, used to perform an atomic add operation with a comparison condition on sixth data of a preset quantity of bytes; and an exclusive atomic command, used to obtain exclusive access permission for a local or remote memory address according to a cache coherence protocol.

It should be noted that content such as information exchange and an execution process between the modules/units in the second network device 1500 provided in FIG. 15 is based on a same concept as an execution process of the second network device in the method embodiment corresponding to FIG. 6 in this application. For specific content, refer to the descriptions in the method embodiment in this application. Details are not described herein again.

Figure 16:
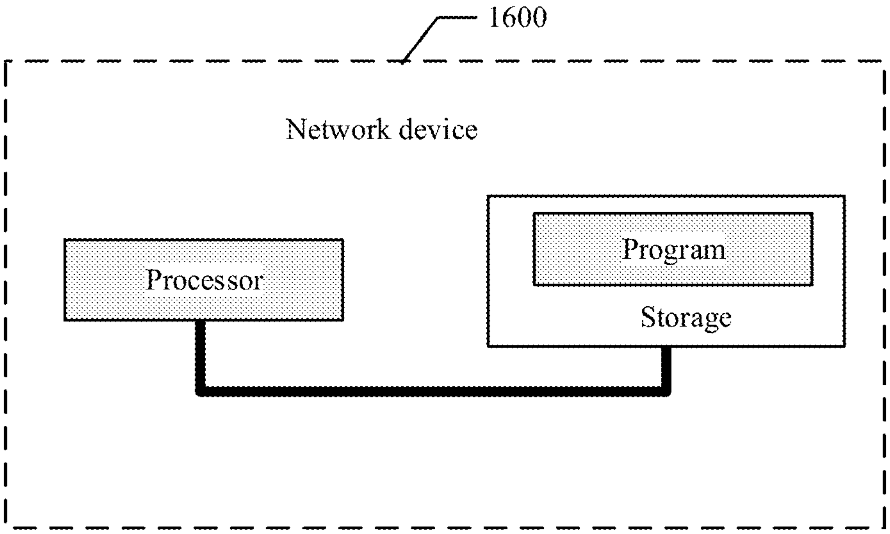
FIG. 16 is a diagram of a structure of a network device according to an embodiment of this application.

An embodiment of this application further provides a network device. FIG. 16 is a diagram of a structure of a network device according to an embodiment of this application. For ease of description, only a part related to this embodiment of this application is shown. For specific technical details that are not disclosed, refer to the method part in embodiments of this application. The network device 1600 may include but is not limited to a processor and a storage. A person skilled in the art may understand that the diagram is merely an example of the network device, and does not constitute a limitation on the network device. The network device may include more or fewer components than those shown in the figure, or may combine some components, or may have different components. For example, the network device may further include an input/output device, a network access device, and a bus. The module described in embodiments corresponding to FIG. 13 to FIG. 15 may be deployed on the network device 1600, and is configured to implement a function of the first network device or the second network device in embodiments corresponding to FIG. 13 to FIG. 15.

Specifically, the processor may be a general-purpose processor, a digital signal processor (DSP), an application-specific integrated circuit (ASIC), a field programmable gate array (FPGA) or another programmable logic device, a discrete gate or transistor logic device, or a discrete hardware component. The general-purpose processor may be a microprocessor, or the processor may be any conventional processor, or the like. The processor is a control center of the network device, and is connected to various parts of the entire network device through various interfaces and lines.

The storage may be configured to store a program and/or a module. The processor runs or executes the computer program and/or the module stored in the storage and calls data stored in the storage, to implement various functions of the network device. The storage may mainly include a program storage area and a data storage area.

An embodiment of this application further provides a computer-readable storage medium. The computer-readable storage medium stores a program for signal processing. When the program is run on a computer, the computer is enabled to perform the operations performed by the computer device in the descriptions of the foregoing embodiments.

In addition, it should be noted that the described apparatus embodiments are merely an example. The units described as separate parts may or may not be physically separate, and parts displayed as units may or may not be physical units, may be located in one position, or may be distributed on a plurality of network units. Some or all the modules may be selected based on actual requirements to achieve the objectives of the solutions of embodiments. In addition, in the accompanying drawings of the apparatus embodiments provided by this application, connection relationships between modules indicate that the modules have communication connections with each other, which may be implemented as one or more communication buses or signal cables.

Based on the descriptions of the foregoing implementations, a person skilled in the art may clearly understand that this application may be implemented by software in addition to necessary universal hardware, or by dedicated hardware, including an application-specific integrated circuit, a dedicated CPU, a dedicated storage, a dedicated component, and the like. Usually, any functions that can be performed by a computer program can be easily implemented by using corresponding hardware. In addition, a specific hardware structure used to achieve a same function may be in various forms, for example, in a form of an analog circuit, a digital circuit, or a dedicated circuit. However, as for this application, software program implementation is a better implementation in most cases. Based on such an understanding, technical solutions of this application essentially or a part contributing to the conventional technology may be implemented in a form of a software product. The computer software product is stored in a readable storage medium, for example, a floppy disk, a USB flash drive, a removable hard disk, a read-only memory (ROM), a random access memory (RAM), a magnetic disk, or an optical disc of a computer, and includes several instructions for instructing a computer device (which may be a personal computer, a training device, a network device, or the like) to perform the methods described in embodiments of this application.

All or some of the foregoing embodiments may be implemented by using software, hardware, firmware, or any combination thereof. When software is used to implement embodiments, all or some of the embodiments may be implemented in a form of a computer program product.

The computer program product includes one or more computer instructions. When the computer program instructions are loaded and executed on the computer, the procedure or functions according to embodiments of this application are all or partially generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, training device, or data center to another website, computer, training device, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, such as a training device or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state disk (SSD)), or the like.

The invention claimed is:

1. A method for processing network data, comprising:

obtaining, by a first network device, a first orchestration operator, wherein the first orchestration operator is an ordered set of orchestration commands generated by a control unit of a first computer device based on a first request, including a memory access command indicating a type of a memory access operation, and wherein the first orchestration operator indicates execution logic of the first request, the first request is generated by a first application executed on the first computer device, wherein the first orchestration operator is a segment of code that implements a specific communication function and that is executed as an orchestration task;

performing, by the first network device, a plurality of memory access operations based on the first orchestration operator, and obtaining a response result of each of the memory access operations; and generating, by the first network device, a first completion instruction in response to obtaining the response result of each of the memory access operations, wherein the first completion instruction indicates that execution of the first orchestration operator is completed.

2. The method according to claim 1, wherein before performing the plurality of memory access operations based on the first orchestration operator, the method further comprises:

generating, by the first network device, a first orchestration context corresponding to the first orchestration operator, wherein the first orchestration context is used to store an execution status of the memory access operation.

3. The method according to claim 2, wherein the first orchestration context comprises at least one of the following:

a caller of the first orchestration operator, a pointer of a currently executed orchestration command, a counter of an asynchronously executed orchestration command, a location of a last orchestration command in the first orchestration operator, a loop counter, a loop jump location, or an intermediate variable in a process of performing the memory access operation.

4. The method according to claim 1, wherein the memory access operation comprises a remote memory access operation, and the performing a plurality of memory access operations based on the first orchestration operator, and obtaining a response result of each of the memory access operations comprises:

parsing, by the first network device, the orchestration command in the first orchestration operator to obtain a plurality of remote memory access operations;

sending, by the first network device, a network packet corresponding to a remote memory access operation to a second network device, so that the second network device accesses, based on the network packet, a memory corresponding to the second network device and generates a response result after completing access; and receiving, by the first network device, the response result sent by the second network device.

5. The method according to claim 1, wherein the memory access operation comprises a local memory access operation, and the performing a plurality of memory access operations based on the first orchestration operator, and obtaining a response result of each of the memory access operations comprises:

parsing, by the first network device, the orchestration command in the first orchestration operator to obtain a plurality of local memory access operations; and accessing, by the first network device, a local memory based on the first orchestration operator to obtain a response result of each of the local memory access operations.

6. The method according to claim 1, wherein the obtaining a first orchestration operator comprises:

obtaining, by the first network device, a first execution instruction from the first computer device, wherein the first execution instruction instructs the first network device to read the first orchestration operator from a first storage area.

7. The method according to claim 1, wherein the obtaining a first orchestration operator comprises:

receiving, by the first network device, the first orchestration operator sent by the first computer device.

8. The method according to claim 1, wherein the first orchestration operator further comprises at least one type of the following orchestration commands:

a control command to control the first network device, or a computation command to perform an arithmetic and/or logical operation on at least one operand.

9. The method according to claim 8, wherein a type of the control command comprises at least one of the following:

a conditional jump command to jump to at least one first target orchestration command based on a variable parameter whose specific value is determined only when the orchestration command is executed;

a loop command cyclically execute at least one second target orchestration command for at least once;

a wait command to wait until execution of at least one third target orchestration command is completed;

a local orchestration operator call command to asynchronously call a local orchestration operator;

a remote orchestration operator call command to asynchronously call a remote orchestration operator; or an orchestration end command to end execution of an orchestration context.

10. The method according to claim 8, wherein a type of the computation command comprises at least one of the following:

a binary arithmetic and/or logical computation command to obtain a first computation result based on two operands; or a bit width conversion computation command to convert a bit width of an operand to obtain a second computation result.

11. The method according to claim 1, wherein a type of the memory access command comprises at least one of the following:

a load command to fetch first data of a preset quantity of bytes from a local memory address, or to fetch second data of a preset quantity of bytes from a remote memory address;

a store command to write third data of a preset quantity of bytes into a local memory address, or to write fourth data of a preset quantity of bytes into a remote memory address;

a memory copy command to copy data between different computer devices;

a compare command to compare data between different computer devices;

a send/receive command to send/receive a two-sided message;

an atomic write command to perform atomic swap with a comparison condition and a mask on fifth data of a preset quantity of bytes;

an atomic add command to perform an atomic add operation with a comparison condition on sixth data of a preset quantity of bytes; or an exclusive atomic command to obtain an exclusive access permission for a local or remote memory address according to a cache coherence protocol.

12. A method for processing network data, comprising:

obtaining, by a first network device, a target execution instruction from a first computer device, wherein the target execution instruction instructs a second network device to read a second orchestration operator from a second storage area, the second orchestration operator is an ordered set of orchestration commands generated by a control unit of a second computer device based on a second request, including a memory access command indicating a type of a memory access operation, wherein the second orchestration operator indicates execution logic of the second request, the second request is generated by a second application executed on the second computer device;

generating, by the first network device, a target network packet according to the target execution instruction, and sending the target network packet to the second network device, so that the second network device reads the second orchestration operator from the second storage area based on the target network packet, the second network device performs a plurality of memory access operations based on the second orchestration operator, and the second network device obtains a response result of each of the memory access operations and generates a target response of the target network packet; and generating, by the first network device, a second completion instruction in response to receiving the target response sent by the second network device, wherein the second completion instruction indicates that execution of the second orchestration operator is completed.

13. The method according to claim 12, wherein the second orchestration operator further comprises at least one type of the following orchestration commands:

a control command to control the second network device, or a computation command to perform an arithmetic and/or logical operation on at least one operand.

14. The method according to claim 13, wherein a type of the control command comprises at least one of the following:

a conditional jump command to jump to at least one first target orchestration command based on a variable parameter whose specific value is determined only when the orchestration command is executed;

a loop command to cyclically execute at least one second target orchestration command for at least once;

a wait command to wait until execution of at least one third target orchestration command is completed;

a local orchestration operator call command to asynchronously call a local orchestration operator;

a remote orchestration operator call command to asynchronously call a remote orchestration operator; or an orchestration end command to end execution of an orchestration context, wherein the orchestration context is used to store an execution status of the memory access operation.

15. The method according to claim 13, wherein a type of the computation command comprises at least one of the following:

a binary arithmetic and/or logical computation command to obtain a first computation result based on two operands; or a bit width conversion computation command to convert a bit width of an operand to obtain a second computation result.

16. The method according to claim 12, wherein a type of the memory access command comprises at least one of the following:

a load command is use to fetch first data of a preset quantity of bytes from a local memory address, or to fetch second data of a preset quantity of bytes from a remote memory address;

a store command to write third data of a preset quantity of bytes into a local memory address, or to write fourth data of a preset quantity of bytes into a remote memory address;

a memory copy command to copy local or remote data;

a compare command to compare local or remote data;

a send/receive command to send/receive a two-sided message;

an atomic compare and swap command to perform atomic swap with a comparison condition and a mask on fifth data of a preset quantity of bytes;

an atomic add command to perform an atomic add operation with a comparison condition on sixth data of a preset quantity of bytes; or an exclusive atomic command to obtain exclusive access permission for a local or remote memory address according to a cache coherence protocol.

17. A network device, comprising:

a storage configured to store a program; and a processor configured to execute the program in the storage, to enable the network device to perform a method, the method comprising:

obtaining a first orchestration operator, wherein the first orchestration operator is an ordered set of orchestration commands generated by a control unit of a first computer device based on a first request, including a memory access command indicating a type of a memory access operation, wherein the first orchestration operator indicates execution logic of the first request, the first request is generated by a first application executed on the first computer device, wherein the first orchestration operator is a segment of code that implements a specific communication function and that is executed as an orchestration task;

performing a plurality of memory access operations based on the first orchestration operator, and obtaining a response result of each of the memory access operations; and generating a first completion instruction in response to obtaining the response result of each of the memory access operations, wherein the first completion instruction indicates that execution of the first orchestration operator is completed.

18. The network device according to claim 17, wherein the method further comprises:

generating a first orchestration context corresponding to the first orchestration operator, wherein the first orchestration context is used to store an execution status of the memory access operation.

19. The network device according to claim 18, wherein the first orchestration context comprises at least one of the following:

a caller of the first orchestration operator, a pointer of a currently executed orchestration command, a counter of an asynchronously executed orchestration command, a location of a last orchestration command in the first orchestration operator, a loop counter, a loop jump location, or an intermediate variable in a process of performing the memory access operation.

20. The network device according to claim 17, wherein the memory access operation comprises a remote memory access operation, and the performing a plurality of memory access operations based on the first orchestration operator, and obtaining a response result of each of the memory access operations comprises:

parsing the orchestration command in the first orchestration operator to obtain a plurality of remote memory access operations;

sending a network packet corresponding to a remote memory access operation to a second network device, so that the second network device accesses, based on the network packet, a memory corresponding to the second network device and generates a response result after completing access; and receiving the response result sent by the second network device.

* * * * *